United States Patent
Watanabe et al.

(10) Patent No.: US 10,705,375 B2
(45) Date of Patent: Jul. 7, 2020

(54) LIGHTING DEVICE AND DISPLAY DEVICE HAVING SIDE EMITTING LIGHT SOURCE AND LIGHT GUIDE

(71) Applicant: SHARP KABUSHIKI KAISHA, Sakai, Osaka (JP)

(72) Inventors: Hisashi Watanabe, Sakai (JP); Hirotoshi Yasunaga, Sakai (JP); Ryuzo Yuki, Sakai (JP); Mitsuhiro Murata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/770,740

(22) PCT Filed: Oct. 21, 2016

(86) PCT No.: PCT/JP2016/081227
§ 371 (c)(1),
(2) Date: Apr. 24, 2018

(87) PCT Pub. No.: WO2017/073471
PCT Pub. Date: May 4, 2017

(65) Prior Publication Data
US 2018/0321556 A1    Nov. 8, 2018

(30) Foreign Application Priority Data
Oct. 30, 2015    (JP) .................. 2015-213911

(51) Int. Cl.
*G02F 1/13357*    (2006.01)
*F21V 8/00*    (2006.01)

(52) U.S. Cl.
CPC ..... *G02F 1/133603* (2013.01); *G02B 6/0025* (2013.01); *G02B 6/0031* (2013.01);
(Continued)

(58) Field of Classification Search
CPC combination set(s) only.
See application file for complete search history.

(56) References Cited

U.S. PATENT DOCUMENTS

2010/0060816 A1* 3/2010 Fukai ............... G02F 1/133615
349/58
2012/0262643 A1* 10/2012 Kweon ............... G02B 6/0091
349/58
2012/0293721 A1   11/2012 Ueyama

FOREIGN PATENT DOCUMENTS

JP    2005-135862 A    5/2005
JP    2007-128820 A    5/2007
(Continued)

*Primary Examiner* — Lauren Nguyen
(74) *Attorney, Agent, or Firm* — ScienBiziP, P.C.

(57) ABSTRACT

A backlight unit includes side emitting-type LEDs, a light guide plate, and an LED board. The light guide plate includes a light entering end surface, a light exiting plate surface, and an opposite plate surface. The LED board includes a plate surface attached to an edge of the opposite plate surface of the light guide plate. A gap is present between light emitting surfaces of the LEDs and the light entering end surface of the light guide plate. Each LED includes a light emitting surface having a dimension in the thickness direction of the light guide plate smaller than a dimension of the light entering end surface in the thickness direction. Each LED is disposed such that the center of the light emitting surface is opposed to the center of the light entering end surface.

14 Claims, 15 Drawing Sheets

(52) U.S. Cl.
CPC ......... *G02B 6/0073* (2013.01); *G02B 6/0091* (2013.01); *G02F 1/133611* (2013.01); *G02F 1/133615* (2013.01)

(56) References Cited

FOREIGN PATENT DOCUMENTS

| | | |
|---|---|---|
| JP | 2007-234832 A | 9/2007 |
| JP | 2009-158318 A | 7/2009 |
| WO | 2011/099328 A | 8/2011 |

\* cited by examiner

FIG.8

| $D_{LGP}$ [mm] | L [μm] | EFFICIENCY OF INCIDENT LIGHT | RATIO RELATIVE TO COMPARATIVE EXAMPLE |
|---|---|---|---|
| 0.4 | 137 | 72% | 1.04 |
| 0.5 | 187 | 80% | 1.14 |
| 0.6 | 237 | 85% | 1.22 |
| 0.7 | 287 | 88% | 1.26 |
| 0.8 | 337 | 90% | 1.30 |
| 0.9 | 387 | 92% | 1.32 |
| 1.1 | 487 | 94% | 1.36 |

FIG.11

| $D_{LGP}$ [mm] | S [μm] | EFFICIENCY OF INCIDENT LIGHT | RATIO RELATIVE TO COMPARATIVE EXAMPLE |
|---|---|---|---|
| 0.4 | 92 | 72% | 1.04 |
| 0.5 | 142 | 80% | 1.14 |
| 0.6 | 192 | 85% | 1.22 |
| 0.7 | 242 | 88% | 1.26 |
| 0.8 | 292 | 90% | 1.30 |
| 0.9 | 342 | 92% | 1.32 |
| 1.1 | 442 | 94% | 1.36 |

FIG.13

| $D_{LGP}$ [mm] | T [μm] | EFFICIENCY OF INCIDENT LIGHT | RATIO RELATIVE TO COMPARATIVE EXAMPLE |
|---|---|---|---|
| 0.4 | 85 | 72% | 1.04 |
| 0.5 | 135 | 80% | 1.14 |
| 0.6 | 185 | 85% | 1.22 |
| 0.7 | 235 | 88% | 1.26 |
| 0.8 | 285 | 90% | 1.30 |
| 0.9 | 335 | 92% | 1.32 |
| 1.1 | 435 | 94% | 1.36 |

FIG.15

| $D_{LGP}$ [mm] | F [μm] | EFFICIENCY OF INCIDENT LIGHT | RATIO RELATIVE TO COMPARATIVE EXAMPLE |
|---|---|---|---|
| 0.4 | 37 | 72% | 1.04 |
| 0.5 | 87 | 80% | 1.14 |
| 0.6 | 137 | 85% | 1.22 |
| 0.7 | 187 | 88% | 1.26 |
| 0.8 | 237 | 90% | 1.30 |
| 0.9 | 287 | 92% | 1.32 |
| 1.1 | 387 | 94% | 1.36 |

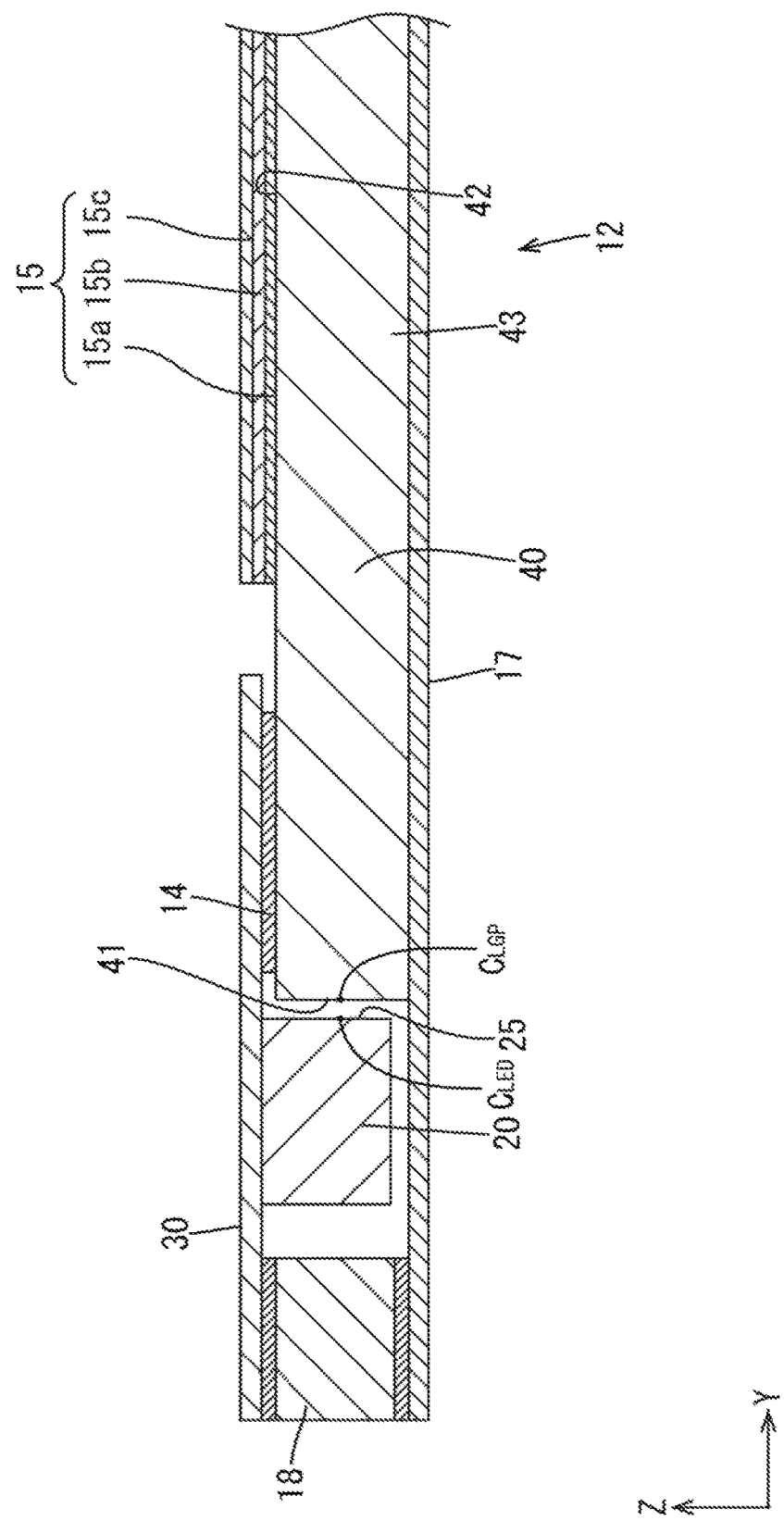

LIGHTING DEVICE AND DISPLAY DEVICE HAVING SIDE EMITTING LIGHT SOURCE AND LIGHT GUIDE

TECHNICAL FIELD

The present invention relates to a lighting device and a display device.

BACKGROUND ART

A liquid crystal display device disclosed in Patent Document 1 has been known as an example of a liquid crystal display device that includes a liquid crystal panel and a backlight unit. The liquid crystal display device disclosed in Patent Document 1 includes side-surface emission type LEDs mounted on a circuit board that is disposed in a thinner section of a reflection sheet. Patent Document 1 describes that optical axes of the LEDs and a middle of the light guide plate with respect to the thickness direction of the light guide plate are closer to each other according to such a configuration. Therefore, efficiency of incident light from the LEDs to the light guide plate improves.

RELATED ART DOCUMENT

Patent Document

Patent Document 1: Japanese Unexamined Patent Application Publication No. 2007-128820

DISCLOSURE OF THE PRESENT INVENTION

Problem to be Solved by the Invention

In the backlight unit of Patent Document 1,
The present invention was made in view of the above circumstances. An object is to improve efficiency of incident light to a light guide plate included in a configuration that includes a side emitting type light source.

Means for Solving the Problem

A lighting device according to the present invention includes at least one light source that is a side emitting type light source, a light guide plate that is a plate-shaped member, and a light source board on which the at least one light source is mounted. The light source includes a mounting surface and a light emitting surface. The mounting surface includes a light source-side terminal. The light emitting surface is located on a side of the mounting surface. The light guide plate includes a light entering end surface, a light exiting plate surface, and an opposite plate surface. The light entering end surface is an end surface of the plate-shaped member. The light entering end surface is opposed to the light emitting surface and through which light rays from the light source enter. The light exiting plate surface is a first plate surface of the plate-shaped member and through which the light rays having entered through the light entering end surface exit. The opposite plate surface is a second plate surface of the plate-shaped member. The light source board includes a plate surface and a board-side terminal. The plate surface is attached to an edge of the opposite plate surface of the light guide plate on a light entering surface side or an edge of the light exiting plate surface on a light entering surface side. The board-side terminal is formed on the plat surface and connected to the light source-side terminal. The light emitting surface of the light source and the light entering end surface of the light guide plate are opposed to each other with a gap. The light source includes a light emitting surface having a dimension in a thickness direction of the light guide plate smaller than a dimension of the light entering end surface in the thickness direction. The light source is disposed such that a center of the light emitting surface is opposed to a center of the light entering end surface.

In an ideal condition in which the light emitting surface of the light source and the light entering end surface of the light guide plate are closely attached to each other, efficiency of incident light is substantially 100%. In the configuration including the side emitting type light source, a gap may be created between the light emitting surface and the light entering end surface due to a mounting error in mounting the light source to the light source board. Through extensive study, the inventors of the present application found that the efficiency of incident light from the light emitting surface to the light guide plate and a positional relation between the light emitting surface and the light entering end surface have a relation illustrated in the graph in FIG. 6 when the gap is present between the light emitting surface of the light source and the light entering end surface of the light guide plate. According to the results, by disposing the light source such that the center of the light emitting surface is opposed to the center of the light entering end surface, the efficiency of incident light from the light source to the light guide plate can be sufficiently improved in comparison to a configuration in which the center of the light emitting surface is off the center of the light entering end surface.

Preferred embodiments of the present invention may include the following configurations.

(1) The dimension of the light entering end surface of the light guide plate in the thickness direction of the light guide plate may be larger than the dimension of the light emitting surface by 0.2 mm or greater. According to the configuration, the efficiency of incident light from the light emitting surface to the light guide plate can be further properly improved as illustrated in the graph in FIG. 6.

(2) The dimension of the light entering end surface of the light guide plate in the thickness direction of the light guide plate may be larger than the dimension of the light emitting surface by 0.5 mm or greater. According to the configuration, the efficiency of incident light from the light emitting surface to the light guide plate can be further properly improved as illustrated in the graph in FIG. 6.

(3) The lighting device may further include a light blocking member configured to block some of the light rays from the at least one light source. The light blocking member may be disposed such that an edge on a light guide plate side is disposed at a position in a range from 0.5 mm to 2.0 mm from the light emitting surface with respect to an arrangement direction in which the at least one light source and the light guide plate are arranged. With the positional relation between the light emitting surface and the light entering end surface defined as above, a high level of the efficiency of incident light from the light emitting surface to the light guide plate can be achieved. Therefore, the uneven brightness (so-called eyeball-type uneven brightness) resulting from the light rays that do not enter the light guide plate is reduced. This configuration in which the width of the light blocking member is defined as described above contributes to the reduction in frame size of the display device that includes the lighting device.

(4) The plate surface of the light source board may be attached to the edge of the opposite plate surface of the light guide plate on the light entering end surface side. According to the configuration, the light rays from the light exiting plate surface are less likely to be blocked by the light source board that is disposed on the light exiting plate surface side. This configuration can further properly contribute to the reduction in frame size of the display device that includes the lighting device.

(5) The light source may be configured such that a dimension between the mounting surface and an edge of the light emitting surface on a light source board side may be larger than a dimension between a surface on an opposite side from the mounting surface and an edge of the light emitting surface on an opposite side from the light source board. According to the configuration, ΔD illustrated in the graph in FIG. 6 can be properly increased and thus the efficiency of incident light from the light emitting surface to the light guide plate can be further properly improved.

(6) The light source board may include at least a trace and a supporting layer. The trace may be formed in a pattern from a conductive layer and connected to the light source-side terminal via the board-side terminal. The supporting layer may support the trace from an opposite side from the light source. The light source has a dimension L between the mounting surface and an edge of the light emitting surface on a light source board side. The dimension L may be defined to satisfy the following equation:

$$L=(D_{LGP}-D_{LED})/2-D1+D2$$

where $D_{LGP}$ is a dimension of the light entering end surface, $D_{LED}$ is a dimension of the light emitting surface, D1 is a dimension between the supporting layer and the mounting surface of the light source, and D2 is a dimension between the supporting layer and a plate surface of the light guide plate to which the light source board is attached. According to the configuration, a backlight unit with high efficiency of incident light can be properly designed.

(7) The light source board may include at least a trace, a supporting layer, and a soldering portion. The trace may be formed in a pattern from a conductive layer and connected to the light source-side terminal via the board-side terminal. The supporting layer may support the trace from an opposite side from the light source. The soldering portion may be disposed between the trace and the at least one light source to connect the board-side terminal to the light source-side terminal. The soldering portion may have a dimension in a thickness direction of the light guide plate defined in a range from 92 μm to 200 μm. According to the configuration, ΔD illustrated in the graph in FIG. 6 can be properly increased and thus the efficiency of incident light from the light emitting surface to the light guide plate can be further properly improved.

(8) The soldering portion may have a dimension S in the thickness direction of the light guide plate. The dimension S may be defined to satisfy the following equation:

$$S=(D_{LGP}-D_{LED})/2-D3+D2-L$$

where L is a dimension between the mounting surface and an edge of the light emitting surface on a light source board side, $D_{LGP}$ is a dimension of the light entering end surface, $D_{LED}$ is a dimension of the light emitting surface, D3 is a dimension between the supporting layer of the light source board and the mounting surface of the light source excluding the soldering portion, and D2 is a dimension between the supporting layer and a plate surface of the light guide plate to which the light source board is attached. According to the configuration, the backlight unit with high efficiency of incident light can be properly designed.

(9) The light source board may include at least a trace and a supporting layer. The trace may be formed in a pattern from a conductive layer and connected to the light source-side terminal via the board-side terminal. The supporting layer may support the trace from an opposite side from the light source. The board-side terminal may have a dimension in the thickness direction of the light guide plate equal to or greater than 85 μm. According to the configuration, ΔD illustrated in the graph in FIG. 6 can be properly increased and thus the efficiency of incident light from the light emitting surface to the light guide plate can be further properly improved.

(10) The board-side terminal may have a dimension T in the thickness direction of the light guide plate. The dimension T may be defined to satisfy the following equation:

$$T=(D_{LGP}-D_{LED})/2-D4+D2-L$$

where L is a dimension between the mounting surface and an edge of the light emitting surface on a light source board side, $D_{LGP}$ is a dimension of the light entering end surface, $D_{LED}$ is a dimension of the light emitting surface, D4 is a dimension between the supporting layer and the mounting surface of the light source excluding the board-side terminal, and D2 is a dimension between the supporting layer and a plate surface of the light guide plate to which the light source board is attached. According to the configuration, the backlight unit with high efficiency of incident light can be properly designed.

(11) The light source board may include a light guide plate overlapping section and a light source mounting section overlapping the light guide plate and the light source in the thickness direction of the light guide plate, respectively. The light source mounting section may include a trace, a supporting layer, and an elevating layer. The trace may be formed in a pattern from a first conductive layer and connected to the light source-side terminal via the board-side terminal. The supporting layer may support the trace from an opposite side from the light source. The elevating layer may include a plurality of layers including a second conductive layer that connects the trace to the board-side terminal. The elevating layer may elevate the board-side terminal from the supporting layer. The light guide plate overlapping section may include the trace and the supporting layer but not include the elevating layer. According to the configuration, ΔD illustrated in the graph in FIG. 6 can be properly increased and thus the efficiency of incident light from the light emitting surface to the light guide plate can be further properly improved.

(12) The first conductive layer and the second conductive layer may be connected to each other via a through hole. According to the configuration, the first conductive layer and the second conductive layer can be connected to each other with a technology regarding a through hole, which is a general-purpose technology. Therefore, the backlight unit with high efficiency of incident light can be properly designed.

(13) The elevating layer may have a dimension F in the thickness direction of the light guide plate. The dimension F may be defined to satisfy the following equation:

$$F=(D_{LGP}-D_{LED})/2-D5+D2-L$$

where L is a dimension between the mounting surface and an edge of the light emitting surface on a light source board side, $D_{LGP}$ is a dimension of the light entering end surface, $D_{LED}$ is a dimension of the light emitting surface, D5 is a dimension between the supporting layer of the light source board and the mounting surface of the light source excluding the elevating layer, and D2 is a dimension between the supporting layer and a plate surface of the light guide plate to which the light source board is attached. According to the configuration, the backlight unit with high efficiency of incident light can be properly designed.

Next, to solve the problem described earlier, a display device according to the present invention includes the lighting device described above and a display panel configured to display an image using the light rays from the lighting device. According to the display device having such a configuration, because the efficiency of incident light is improved in the lighting device, the display device with high brightness and low power consumption can be provided.

Advantageous Effect of the Invention

According to the present invention, efficiency of incident light to a light guide plate included in a configuration that includes a side emitting type light source can be improved.

BRIEF DESCRIPTION OF THE DRAWINGS

FIG. 8 is a table illustrating ratios of efficiency of incident light at specified $D_{LGP}$s and Ls relative to efficiency of incident light of a comparative example.

FIG. 11 is a table illustrating ratios of efficiency of incident light at specified $D_{LGP}$s and Ss relative to efficiency of incident light of a comparative example.

FIG. 13 is a table illustrating ratios of efficiency of incident light at specified $D_{LGP}$s and Ts relative to efficiency of incident light of a comparative example.

FIG. 15 is a table illustrating ratios of efficiency of incident light at specified $D_{LGP}$s and Fs relative to efficiency of incident light of a comparative example.

FIG. 16 is a magnified side cross-sectional view of a section including an LED and therearound in a backlight unit according to other embodiments of the present invention.

MODE FOR CARRYING OUT THE INVENTION

First Embodiment

Figure 1:
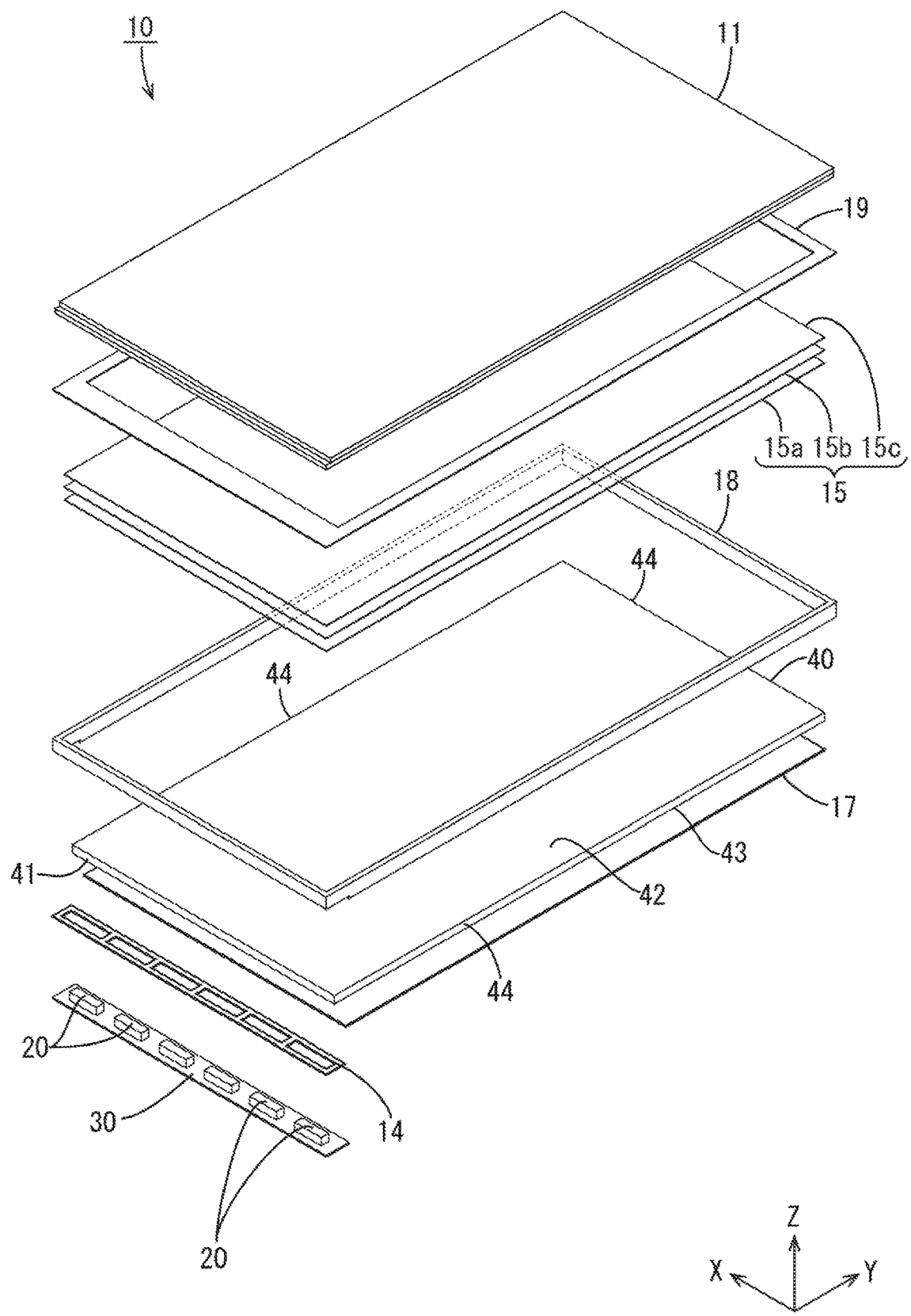
FIG. 1 is an exploded perspective view of a liquid crystal display device according to a first embodiment of the present invention.

A first embodiment of the present invention will be described with reference to FIGS. 1 to 5. In this section, a liquid crystal display device 10 (a display device) including a liquid crystal panel 11 that is a display panel will be described. X-axes, Y-axes, and Z-axes may be present in the drawings. The vertical direction is based on FIG. 2. An upper side and a lower side in FIG. 2 correspond to a front side and a back side of the liquid crystal display device 10, respectively.

The liquid crystal display device 10 has a rectangular shape as a whole. As illustrated in FIG. 1, the liquid crystal display device 10 includes at least the liquid crystal panel 11 (a display panel) and a backlight unit 12 (a lighting unit). The liquid crystal panel 11 is configured to display images. The backlight unit 12 is disposed on a back side relative to the liquid crystal panel 11. The backlight unit 12 is an external light source configured to supply light to the liquid crystal panel 11. The liquid crystal display device 10 may include a bezel, which is not illustrated, disposed on the front side relative to the liquid crystal panel 11 for holding an outer edge portion (a non-display area, which will be described later) of the liquid crystal panel 11 between the bezel and the backlight unit 12. The liquid crystal display device 10 may include a touchscreen or a cover panel, which is not illustrated, disposed on the front side relative to the liquid crystal panel 11 to cover the front side of the liquid crystal panel 11. The liquid crystal display device 10 according to the present embodiment may be mainly for a portable electronic device such as a smart phone and a tablet-type laptop computer. A screen size of the liquid crystal display device 10 may be from about four inches to about twenty inches.

Figure 2:
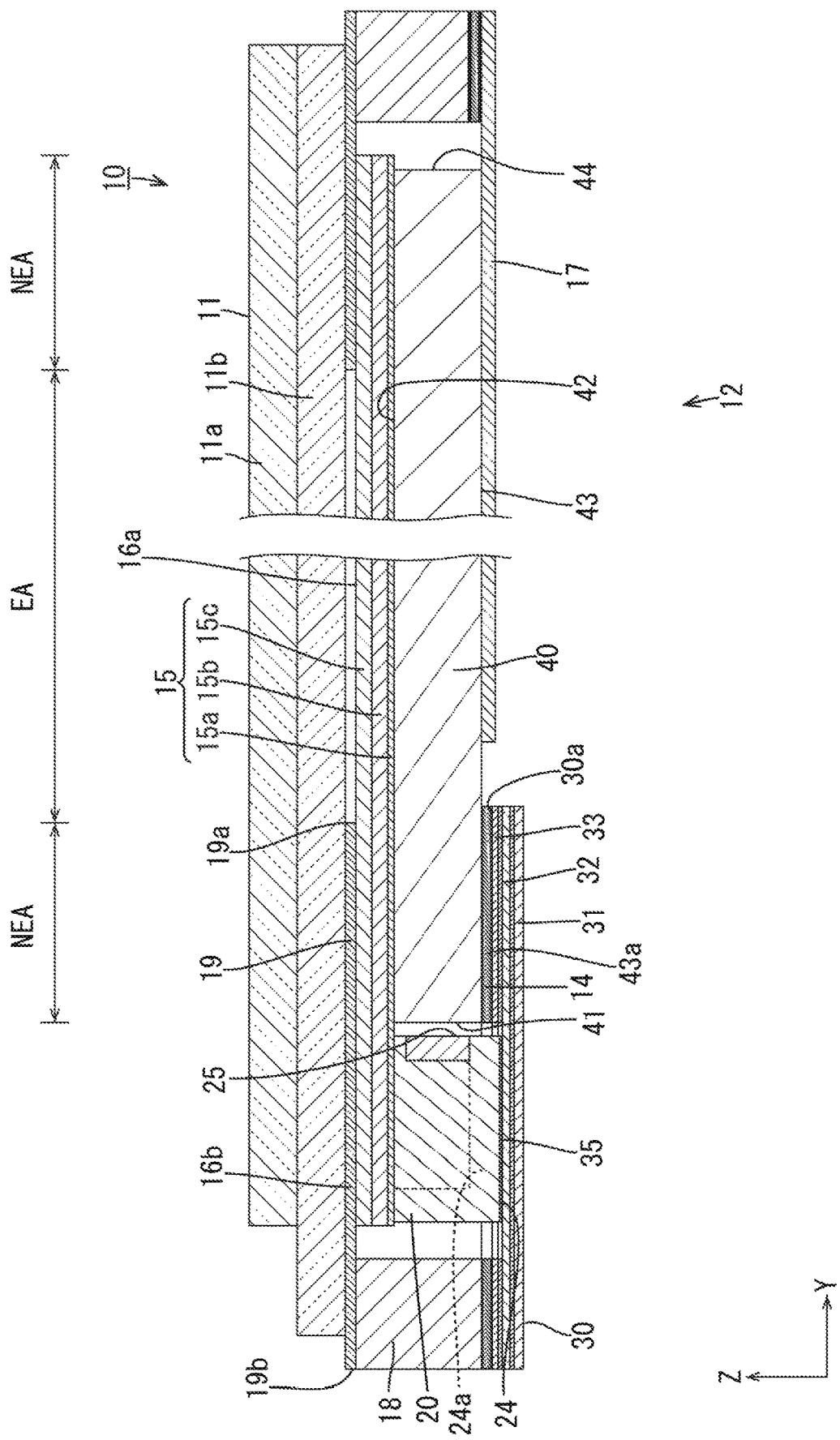
FIG. 2 is a side cross-sectional view of the liquid crystal display device.

The liquid crystal panel 11 will be described in detail. The liquid crystal panel 11 has a rectangular overall shape in a plan view. As illustrated in FIGS. 1 and 2, the liquid crystal panel 11 includes a pair of substantially transparent glass substrates 11a and 11b having high light transmissivity and a liquid crystal layer (not illustrated) between the substrates 11a and 11b. The liquid crystal layer includes liquid crystals that are substances having optical characteristics that vary according to application of electric field. The substrates 11a and 11b are bonded together with a sealing member that is not illustrated with a gap corresponding to a thickness of the liquid crystal layer therebetween. The liquid crystal panel 11 includes a display area AA (an active area) and a frame-shaped non-display area NAA (a non-active area). Images are displayed in the display area AA. Images are not displayed in the non-display area NAA. One of the substrates 11a and 11b included in the liquid crystal panel 11 on the front side is a CF substrate 11a and one on the rear side (the back side) is an array substrate 11b. A flexible circuit board including a first end that is connected to a signal source (e.g., a control circuit board) and a second end that is connected to the array substrate 11b (the flexible circuit board and the signal source are not illustrated). Various signals are supplied from the signal source to the array substrate 11b. Polarizing plates, which are not illustrated, are attached to outer surfaces of the substrates 11a and 11b, respectively. The short direction of the liquid crystal panel 11 corresponds with the Y-axis direction. The long direction of the liquid crystal panel 11 corresponds with the X-axis direction. The thickness direction of the liquid crystal panel 11 corresponds with the Z-axis direction.

An internal configuration of the liquid crystal panel 11 in the display area (not illustrated) will be described. A number of thin film transistors (TFTs) which are switching components and a number of pixel electrodes are arranged in a matrix on an inner surface of the array substrate 11b. Furthermore, gate lines and source lines are routed on the inner surface of the array substrate 11b to form a grid to surround the TFTs and the pixel electrodes. Signals related to images are supplied to the gate lines and the source lines by the signal source. The pixel electrodes disposed in quadrilateral areas defined by the gate lines and the source lines are transparent electrodes made of indium tin oxide (ITO) or zinc oxide (ZnO). A number of color filters are disposed on the CF substrate 11a at positions corresponding to the pixels. The color filters include three colors of R, G and B that are alternately arranged. A light blocking layer (a black matrix) is formed among the color filters for reducing color mixture. A common electrode is disposed on surfaces of the color filters and the light blocking layer to be opposed to the pixel electrodes on the array substrate 11b. The CF substrate 11a is slightly smaller than the array substrate 11b. Alignment films are formed on inner surfaces of the substrates 11a and 11b for orienting liquid crystal molecules in the liquid crystal layer.

Next, the configuration of the backlight unit 12 will be described. The backlight unit 12 has a rectangular block-like overall shape in a plan view similar to the liquid crystal panel 11. As illustrated in FIG. 1, the backlight unit 12 includes at least light emitting diodes (LEDs) 20 which are light sources, an LED board 30 (a light source board) on which the LEDs 20 are mounted, a light guide plate 40, an optical sheet 15 (an optical member), a reflection sheet 17 (a reflection member), and a frame 18 (a frame member). The light guide plate 40 is configured to guide light rays emitted by the LEDs 20. The optical sheet 15 is layered on the front side of the light guide plate 40. The reflection sheet 17 is layered on the rear side of the light guide plate 40. The frame 18 has a frame shape to collectively surround the LEDs 20, the light guide plate 40, and the optical sheet 15. The backlight unit 12 is an edge light-type (a side light-type) backlight unit in which the LEDs 20 (on the LED board 30) is disposed closer to one of the short sides of the backlight unit 12 or the liquid crystal panel 11 so that the light rays enter the light guide plate 40 only from one side. Components of the backlight unit 12 will be described in sequence below.

Figure 3:
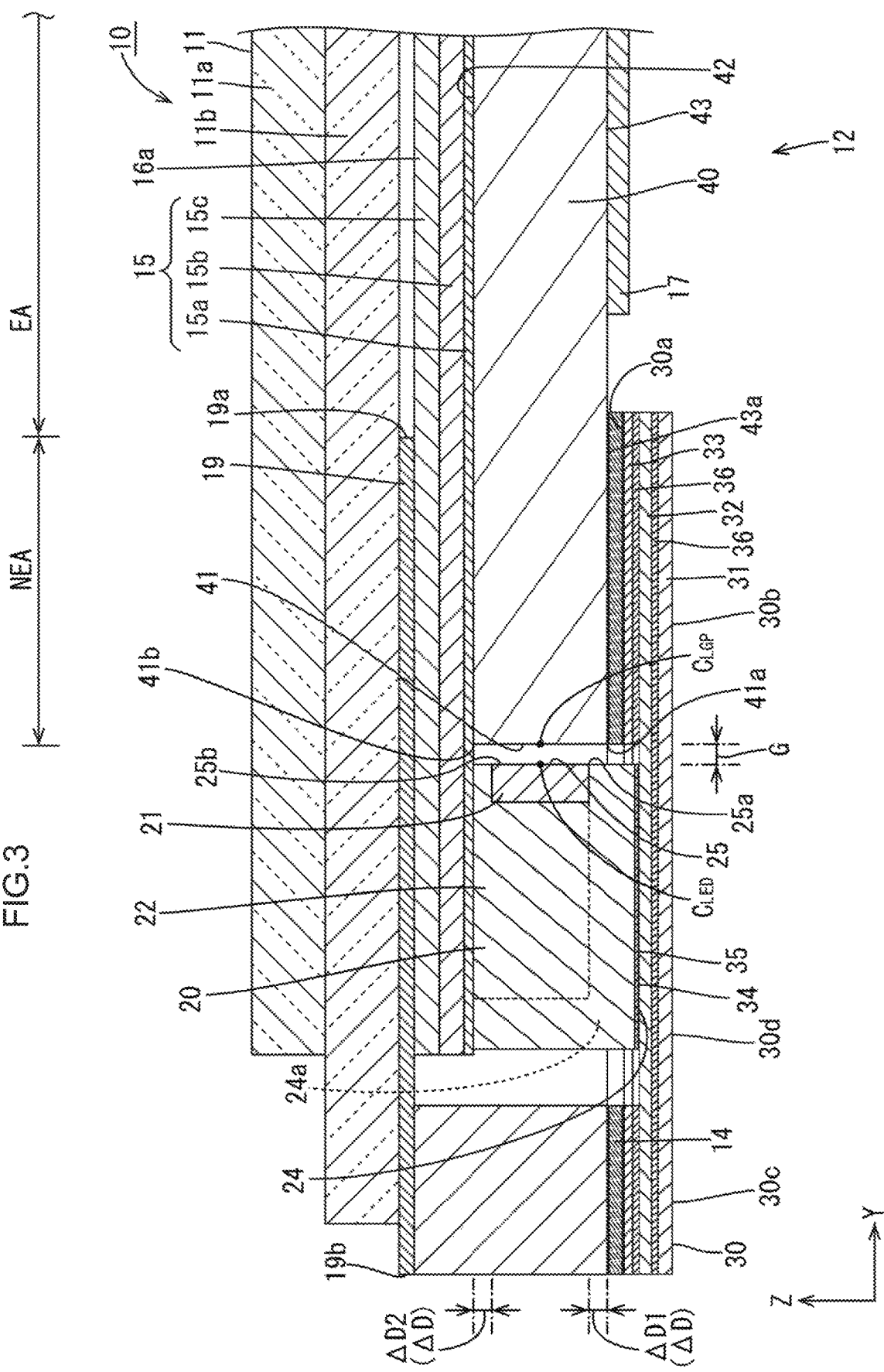
FIG. 3 is a magnified side cross-sectional view of a section including an LED and therearound in FIG. 2.

As illustrated in FIG. 3, each LED 20 includes a substrate that is bonded to a plate surface of the LED board 30, an LED chip (not illustrated), and a resin 21. The LED chip is a semiconductor light emitting component sealed with the resin 21. The LED chip and the resin 21 are held inside a housing 22. The LED chip mounted on the substrate has one kind of main emission wavelength. Specifically, the LED chip is configured to emit light in a single color of blue. Phosphor particles that emit predefined color of light when excited by the blue light emitted by the LED chip are dispersed in the resin 21 that seals the LED chip. The LED 20 emits substantially white light as a whole. The LED 20 is a side emitting type LED. The LED 20 includes a mounting surface 24 and a light emitting surface 25. The mounting surface 24 includes LED-side terminals 24a (light source-side terminals). The light emitting surface 25 is on a side of the mounting surface 24. The light emitting surface 25 is a section of a surface of the LED 20 opposed to a light entering end surface 41 of the light guide plate 40 and surrounded by the housing 22 in which the resin 21 is exposed. An optical axis LA of each LED 20 is at the center of the light emitting surface 25 of the LED 20. Light exiting from the LED 20 through the light emitting surface 25 has luminous intensity distribution to spread symmetrically about an axis that passes the center $C_{LED}$ of the LED 20 in the Z-axis direction.

As illustrated in FIGS. 1 and 3, the LED board 30 is in a form of film (sheet) having flexibility. The LED board 30 is disposed such that a plate surface thereof is parallel to plate surfaces of the liquid crystal panel 11, the light guide plate 40, and the optical sheet 15. The LED board 30 includes a supporting layer 31, a trace 32, and a covering layer 33. The supporting layer 31 is formed from a film made of synthetic resin having flexibility and an insulating property (e.g., polyimide resin). The trace 32 is formed in a pattern with a predefined line width from a conductive film such as a metal foil (e.g., a copper foil). The covering layer 33 is formed on the supporting layer 31 to cover the trace 32. In the sections of the trace 32, board-side terminals 34 are disposed to be exposed through holes formed in the covering layer 33. The board-side terminals 34 are connected to the LED-side terminals 24a via soldering portions 35. The board-side terminals 34 are formed from a layer of metal (e.g., nickel, gold) on the conductive film through electroplating. The board-side terminals 34 are disposed in areas of a plate surface 30a of the LED board 30 having such a configuration. Most of areas of the plate surface 30a other than areas in which the board-side terminals 34 are disposed are covered with the covering layer 33. The covering layer 33 includes light absorbing sections having light absorbing property. The covering layer 33 including the light absorbing sections that may be formed by disposing a black printing layer (not illustrated) on a coverlay formed from a polyimide resin film or a black coverlay. Instead of the coverlay, a black solder resist may be applied to the trace 32. In this embodiment, the covering layer 33 includes the light absorbing sections. Therefore, in synergy with uneven brightness suppressing effect achieved by arranging the light emitting surfaces 25 such that centers thereof are opposed to the center of the light entering end surface 41, which will be described later, the covering layer 33 can properly suppress the uneven brightness.

As illustrated in FIGS. 1 and 3, the LED board 30 has a horizontally-long rectangular shape in a plan view. The LED board 30 has a long dimension (a length of long sides) is about equal to or slightly larger than a short dimension of the light guide plate 40, which will be described later. The LED board 30 has a width (a short dimension) larger than a distance (a gap) between the light entering end surface 41 of the light guide plate 40 and the frame 18. Therefore, a first edge of the LED board 30 with respect to the width direction of the LED board 30 (the short direction, the Y-axis direction) overlaps a section of the light guide plate 40 (an edge on the light entering end surface 41 side) in a plan view. The first edge is defined as a light guide plate overlapping section 30b. A second edge of the LED board 30 with respect to the width direction of the LED board 30 overlaps the frame 18 in the plan view. The second edge is defined as a frame overlapping section 30c. A section of the LED board 30 between the light guide plate overlapping section 30b and the frame overlapping section 30c is defined as an LED mounting section 30d (a light source mounting section) to which the LEDs 20 are mounted. The LEDs 20 (six of them in this embodiment) are adjacently arranged to each other and mounted on the plate surface 30a. The LEDs 20 are connected in series via the trace 32. The trace 32 is disposed mainly in the light guide plate overlapping section 30b. The light guide plate overlapping section 30b requires a certain width to obtain a sufficient arrangement area for the trace 32. In this embodiment, an inner edge of the LED board 30 on an inner side with respect to the Y-axis direction (an edge on the light guide plate overlapping section 30b side) is disposed 3 mm or more apart from the light emitting surfaces 25 of the LEDs 20. The inner edge may be disposed inner than a non-effective light exiting area NEA of the light guide plate 40 (an outer edge 19a of a light blocking member 19), which will be described later. An area of the plate surface 30a of the light guide plate overlapping section 30b of the LED board 30 is attached to an edge 43a of an opposite plate surface 43 of the light guide plate 40 on the light entering end surface 41 side. A procedure for attaching the LED board 30 to the light guide plate 40 will be described later.

As illustrated in FIGS. 1 and 2, the light guide plate 40 is a plate member having a rectangular shape that is slightly smaller than an internal dimension of the frame 18 in the plan view. The plate surface of the light guide plate 40 is parallel to the plate surface of the liquid crystal panel 11. The long dimension and the short dimension of the plate surface of the light guide plate 40 correspond with the Y-axis direction and the X-axis direction, respectively. The thickness direction of the light guide plate 40, that is, a direction perpendicular to the plate surface, corresponds with the Z-axis direction. The light guide plate 40 is held in the frame 18 with a periphery of the light guide plate 40 surrounded by the frame 18. The light guide plate 40 is disposed under immediately behind the liquid crystal panel 11 and the optical sheet 15. A first short end surface among peripheral end surfaces of the light guide plate 40 is opposed to the LEDs 20 and defined as the light entering end surface 41 through which light rays from the LEDs 20 enter. Other three end surfaces (a second short end surface and a pair of long end surfaces) are defined as LED non-opposed end surfaces 44 that are not opposed to the LEDs 20. The light rays from the LEDs 20 do not directly enter the LED non-opposed end surfaces 44; however, the light rays may indirectly enter the LED non-opposed end surfaces 44. The light guide plate 40 has a thickness that is constant for an entire area thereof. The dimension $D_{LGP}$ of the light entering end surface 41 in the Z-axis direction is about equal to the thickness of the light guide plate 40.

As illustrated in FIG. 2, the front plate surface of the light guide plate (on the liquid crystal panel 11 side) of the front and the rear plate surfaces of the light guide plate 40 is defined as a light exiting plate surface 42 through which the light rays exit toward the liquid crystal panel 11. The light exiting plate surface 42 of the light guide plate 40 includes an effective light exiting area EA that is a middle area and the non-effective light exiting area NEA that is a peripheral area surrounding the effective light exiting area EA. The effective light exiting area EA is an area to which the light rays are effectively directed to exit therethrough. The non-effective light exiting area NEA is an area to which the light rays are not effectively directed to exit therethrough. The light rays exiting through the effective light exiting area EA are supplied to the display area of the liquid crystal panel 11 and effectively used for image display. The effective light exiting area EA overlaps the display area in the plan view. The non-effective light exiting area NEA does not overlap the display area in the plan view. The rear plate surface of the light guide plate 40 is defined as the opposite plate surface 43 on an opposite side from the light exiting plate surface 42. According to the configuration, an arrangement direction in which the LEDs 20 and the light guide plate 40 are arranged corresponds with the Y-axis direction and an arrangement direction in which the optical sheet 15 (the liquid crystal panel 11) and the light guide plate 40 are arranged corresponds with the Z-axis direction. The arrangement directions are perpendicular to each other. The light guide plate 40 receives the light rays emitted by the LEDs 20 in the Y-axis direction through the light entering end surface 41, passes the light rays therethrough, and directs the light rays toward the optical sheet 15 (the front side, the light exiting side) so that planar light including the light rays exits through the light exiting plate surface 42, which is the front plate surface. A light reflecting pattern (not illustrated) is formed on the opposite plate surface 43 of the light guide plate 40. The light reflecting pattern includes light reflectors configured to reflect the light rays inside the light guide plate 40 toward the light exiting plate surface 42 to increase an amount of light exiting through the light exiting plate surface 42. The light reflectors included in the light reflecting pattern are light reflecting dots arranged with distribution density that varies according to a distance from the light entering end surface 41 (the LEDs 20). Specifically, the distribution density of the light reflecting dots of the light reflectors increases as the distance from the light entering end surface 41 in the Y-axis direction increases. The distribution density decreases as the distance from the light entering end surface 41 decreases. According to the configuration, the light rays exiting through the light exiting plate surface 42 have uniform distribution within the plane.

As illustrated in FIGS. 1 and 3, the LED board 30 and the light guide plate 40 having the configuration described above are attached to each other, specifically, the plate surface 30a and the opposite plate surface 43 are attached to each other with a double-sided adhesive tape 14. In this embodiment, the double-sided adhesive tape 14 having a ladder shape is disposed to cover the entire area of the plate surface 30a of the LED board 30 except for areas to which the LEDs 20 are mounted, that is, areas of the light guide plate overlapping section 30b, the frame overlapping section 30c, and the LED mounting section 30d between the LEDs 20. The double-sided adhesive tape 14 attaches the LED board 30 to the light guide plate 40 and to the frame 18.

As illustrated in FIG. 3, the double-sided adhesive tape 14 includes a base 14a and a pair of adhesive layers 14b. The base 14a has a film shape. The adhesive layers 14b are formed on the font surface and the back surface of the base 14a, respectively. The double-sided adhesive tape 14 in this embodiment has a thickness of 50 μm. However, it is preferable to set the thickness of the double-sided adhesive tape 14 in a range from 10 μm to 25 μm to increase efficiency E of incident light with larger $\Delta D_{bottom}$, which will be described later. It is more preferable to set the thickness of the double-sided adhesive tape 14 in a range from 10 μm to 15 μm. The base 14a is made of synthetic resin film such as polyethylene terephthalate (PET). The adhesive layers 14b are made of synthetic resin having adhesiveness (e.g., acrylic-based resin material). The adhesive layers 14b and the base 14a are in black having a high light absorbing property. Specifically, light absorbing materials such as black pigments dispersed in the adhesive layers 14b. Because the adhesive layers 14b are layers having light absorbing properties, the front adhesive layer 14b efficiently absorbs the light rays emitted by the LEDs 20 and traveling to an area between the opposite plate surface 43 of the light guide plate 40 and the base 14a and the rear adhesive layer 14b efficiently absorbs the light rays emitted by the LEDs 20 and traveling to an area between the base 14a and the plate surface 30a of the LED board 30. Therefore, the uneven brightness is further less likely to occur. In this embodiment, the double-sided adhesive tape 14 has the light absorbing property. Therefore, in synergy with uneven brightness suppressing effect achieved by arranging the light emitting surfaces 25 such that centers thereof are opposed to the center of the light entering end surface 41, the double-sided adhesive tape 14 can properly suppress the uneven brightness, similar to the covering layer 33 of the LED board 30.

As illustrated in FIGS. 1 and 2, the optical sheet 15 has a rectangular shape in the plan view similar to the light guide plate 40. Plate surfaces of the optical sheet 15 are parallel to the plate surfaces of the liquid crystal panel 11, the LED board 30, and the light guide plate 40. The long dimension and the short dimension of the plate surfaces correspond with the Y-axis direction and the X-axis direction, respectively. The thickness direction of the optical sheet 15 that is perpendicular to the plate surface corresponds with the Z-axis direction. The optical sheet 15 is placed on the light exiting plate surface 42 of the light guide plate 40 on the front side. The optical sheet 15 is disposed between the liquid crystal panel 11 and the light guide plate 40 to pass the light rays that have exited from the light guide plate 40, exert optical effects on the light rays, and release the light rays toward the liquid crystal panel 11. The optical sheet 15 includes three sheets that are disposed on top of one another. The rearmost sheet placed directly on the light exiting plate surface 42 of the light guide plate 40 is a diffuser sheet 15a. The sheet placed on the front surface of the diffuser sheet 15a is a first prism sheet 15b. The sheet placed on the front surface of the first prism sheet 15b is a second prism sheet 15c. The diffuser sheet 15a has a configuration including a base and diffuser particles dispersed in the base. The diffuser sheet 15a has a function of diffusing the light rays that pass through the diffuser sheet 15a. The first prism sheet 15b and the second prism sheet 15c include bases and prism portions. Each prism portion includes unit prisms disposed on a front plate surface of the corresponding base. The unit prisms extend in the X-axis direction or the Y-axis direction arranged in the Y-axis direction or the X-axis direction. The light rays passing through the unit prisms are refracted by the unit prisms of the prism portion to exert light collecting effects on the light rays selectively in the arrangement direction of the unit prisms. The extending direction and the arrangement direction of the unit prisms in the first prism sheet 15b are perpendicular to the extending direction and the arrangement direction of the unit prisms in the second prism sheet 15c.

Figure 4:
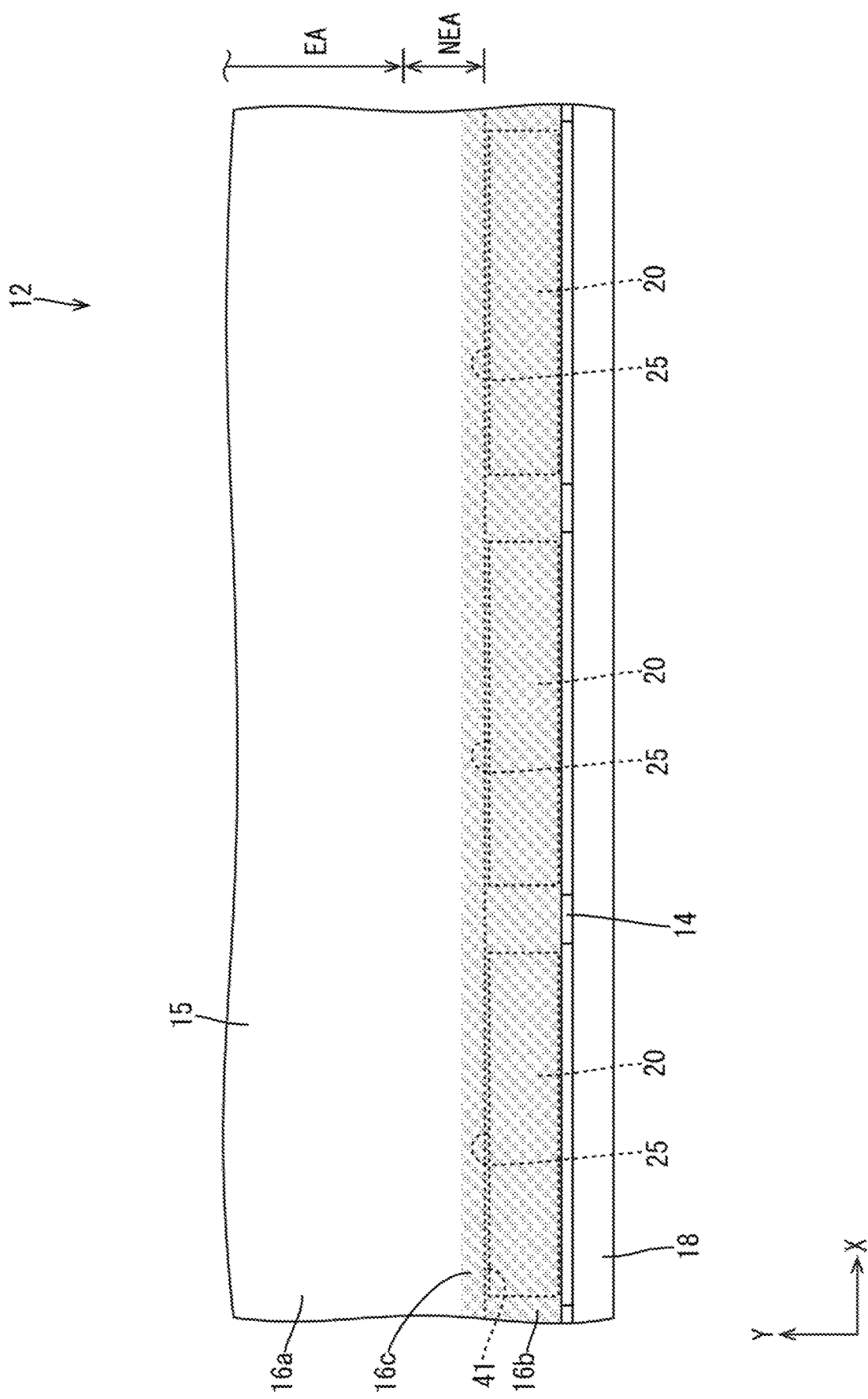
FIG. 4 is a plan view of a backlight unit.

As illustrated in FIGS. 2 and 4, the optical sheet 15 includes a body 16a and an extending portion 16b. The body 16a overlaps the light guide plate 40. The extending portion 16b extends from the light entering end surface 41 of the light guide plate 40 in a form of eaves on the front side relative to the LEDs 20. The extending portion 16b and a section of the body 16a adjacent to the extending portion 16b form a low transmissive area 16c having light transmissivity lower than that of other sections of the body 16a. According to the configuration, even if some of the light rays emitted by the LEDs 20 travel directly toward the optical sheet 15 without passing through the light guide plate 40, the light rays are less likely to pass through the optical sheet 15 because of the low transmissive area 16c. Therefore, bright spots are less likely to be observed in an area of the light guide plate 40 closer to the LEDs 20, that is, the uneven brightness (so-called eyeball-type uneven brightness) is less likely to occur. In FIG. 4, the low transmissive area 16c of the optical sheet 15 is shaded. The low transmission area 16c is formed in a band shape to cover an area of the back surface of the optical sheet 15 (specifically the diffuser sheet 15a, which will be described next) including the extending portion 16b and the section of the body 16a between 0.2 mm and 1 mm apart from the extending portion 16b for the entire length of the short dimension of the optical sheet 15. The low transmissive area 16c defined 0.2 mm or farther from the light emitting surfaces 25 of the LEDs 20 in the Y-axis direction can contribute to reduction of the uneven brightness, which is a so-called eyeball-type uneven brightness described later. The low transmissive area 16c defined up to 1.1 mm or smaller can contribute to reduction of frame size of the liquid crystal display device 10.

As illustrated in FIGS. 1 and 2, the reflection sheet 17 is disposed to cover the opposite plate surface 43 of the light guide plate 40 on the rear side, that is, the opposite side from the light exiting plate surface 42. The reflection sheet 17 is a synthetic resin sheet including a white surface having high light reflectivity. The reflection sheet 17 efficiently directs the light rays traveling in the light guide plate 40 toward the front side (the light exiting plate surface 42). The reflection sheet 17 has a rectangular shape in a plan view similar to the light guide plate 40. The reflection sheet 17 is disposed such that the middle area overlaps the light guide plate 40 on the rear side (the opposite side from the optical sheet 15 side).

The frame 18 is made of synthetic resin. As illustrated in FIGS. 1 and 2, the frame 18 has a rectangular frame outline slightly larger than the light guide plate 40. The frame 18 is disposed to collectively surround the LEDs 20, the light guide plate 40, and multiple optical sheets 15 from outer sides. The frame 18 includes a pair of long portions that extend in the Y-axis direction and a pair of short portions that extend in the X-axis direction. The long portions and the short portions couple with one another. One of the short portions of the frame 18 overlaps a section of the LED board 30 (the frame overlapping section 30c) in the plan view (see FIG. 3). The frame 18 is fixed to the liquid crystal panel 11 with a panel-side double-sided adhesive tape 19.

The panel-side double-sided adhesive tape 19 includes black surfaces having high light absorbing properties and high light blocking properties. The panel-side double-sided adhesive tape 19 has a rectangular frame shape in a plan view similar to the frame 18. The panel-side double-sided adhesive tape 19 defines the effective light exiting area EA of the light exiting plate surface 42 of the light guide plate 40. The panel-side double-sided adhesive tape 19 is disposed to overlap the non-effective light exiting area NEA of the light exiting plate surface 42 of the light guide plate 40 in the plan view. Namely, the panel-side double-sided adhesive tape 19 is a rim tape. The panel-side double-sided adhesive tape 19 is a double-sided adhesive tape that includes a sheet-shaped base and adhesives applied to the front and the back surfaces of the base. The panel-side double-sided adhesive tape 19 has a function of a light blocking member for blocking the light rays from the LEDs 20 on the light exiting plate surface 42 side of the light guide plate 40. In the following description, the panel-side double-sided adhesive tape 19 may be referred to as the light blocking member 19. It is preferable that the base of the panel-side double-sided adhesive tape 19 is made of black material (e.g., black PET). However, the base may be made of white material or transparent material including a surface printed with black paint. The panel-side double-sided adhesive tape 19 is disposed between the frame 18 and the liquid crystal panel 11 with respect to the Z-axis direction. The adhesive on the rear surface of the base and the adhesive on the front surface of the base adhere to the front surface of the frame 18 and the back surface of the liquid crystal panel 11, respectively. The panel-side double-sided adhesive tape 19 is disposed between the optical sheet 15 and the liquid crystal panel 11 with respect to the Z-axis direction and fixed to the optical sheet 15 (specifically, the second prism sheet 15c at the most front). The panel-side double-sided adhesive tape 19 includes the outer edge 19a (on the LED 20 side) and an inner edge 19b (on the light guide plate 40 side). The outer edge 19a is disposed outer than the light emitting surfaces 25 with respect to the Y-axis direction (the arrangement direction in which the LEDs 20 and the light guide plate 40 are arranged). The inner edge 19b is disposed at a position 0.5 mm or farther from the light emitting surfaces 25 but 2.0 mm or closer to the light emitting surfaces 25.

In the backlight unit 12 having the configuration described above, not all the light rays emitted by the LEDs 20 reach the light entering end surface 41 of the light guide plate 40. Some of the light rays may travel directly toward the optical sheet 15 and the LED board 30 without passing through the light guide plate 40, which may be referred to as stray light rays. Such light rays do not exit from the effective light exiting area EA of the light exiting plate surface 42 of the light guide plate 40 and thus may result in reduction in brightness of the backlight unit 12. Such light rays may also result in a bright spot (eyeball-type uneven brightness) around the LEDs 20, that is, uneven brightness. Therefore, improvement in efficiency of incident light from the LEDs 20 to the light entering end surface 41 of the light guide plate 40 is expected.

Figure 5:
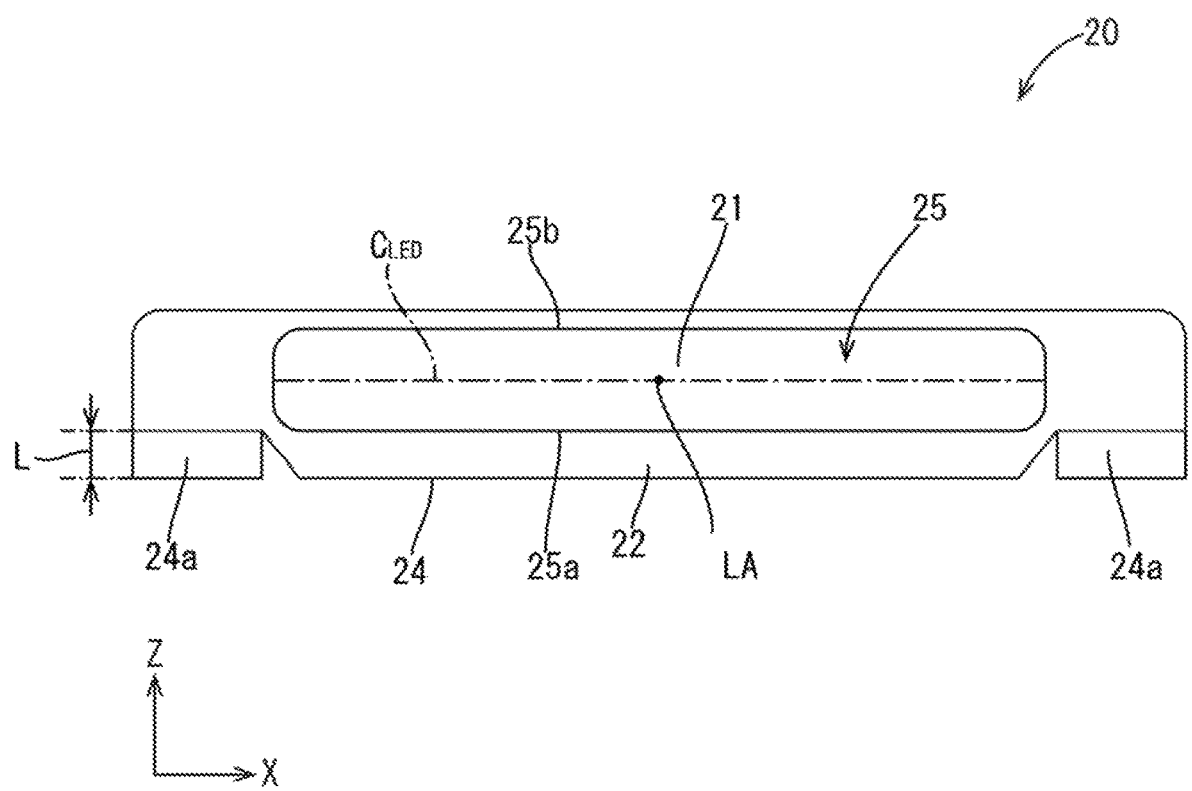
FIG. 5 is a view of an LED viewed from a light emitting surface side.
Figure 6:
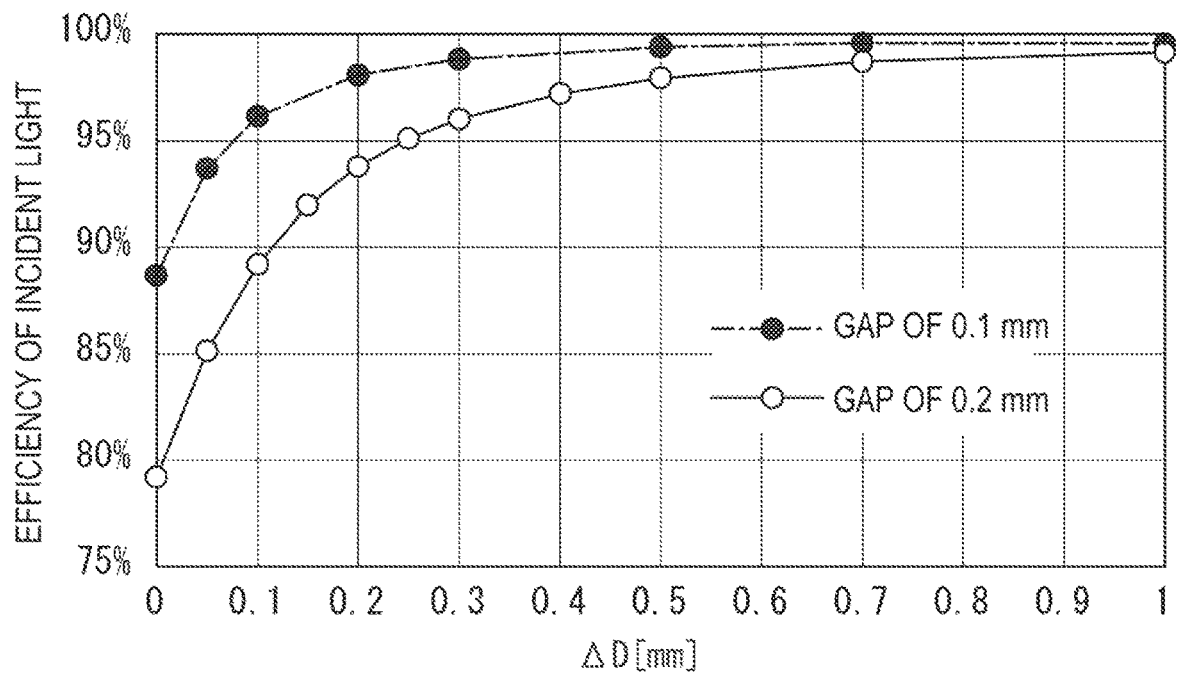
FIG. 6 is a graph illustrating a relation between ΔD and efficiency of incident light.

Through extensive research, the inventors of the present application have found that there is a relation as illustrated in FIG. 6. Specifically, when a gap G, which will be described later, is present between the light emitting surface 25 of the LEDs 20 and the light entering end surface 41 of the light guide plate 40, the relation exits between a positional relation between the light emitting surfaces 25 of the LEDs 20 and the light entering end surface 41 of the light guide plate 40 and efficiency E of incident light from the LEDs 20 to the light guide plate 40 as illustrated in FIG. 5. $\Delta D_{bottom}$ is a distance (mm) between an edge 25a of the light emitting surface 25 on the LED board 30 side (the rear side) and an edge 41a of the light entering end surface 41 on the LED board 30 side, where the edge 25a of the light emitting surface 25 is located inner than the edge 41a of the light entering end surface 41. $\Delta D_{top}$ is a distance (mm) between an edge 25b of the light emitting surface 25 on the opposite side from the LED board 30 side (the front side) and an edge 41b of the light entering end surface 41 on the opposite side from the LED board 30 side, where the edge 25b of the light emitting surface 25 is located inner than the edge 41b of the light entering end surface 41. In this embodiment, the LEDs 20 such that the center $C_{LED}$ of the light emitting surface 25 of each LED 20 is opposed to the center $C_{LGP}$ of the light entering end surface 41 of the light guide plate 40 in the Z-axis direction. $\Delta D_{bottom}$ and $\Delta D_{top}$ are about equal to each other ($\Delta D_{bottom} \approx \Delta D_{top}$). A dimension $D_{LP}$ of the light entering end surface in the thickness direction of the light guide plate (the Z-axis direction) is larger than a dimension $D_{LED}$ of the light emitting surface 25 in the same direction ($D_{LGP} > D_{LED}$). $\Delta D_{bottom}$ and $\Delta D_{top}$ may be referred to as simply $\Delta D$ to describe them in general without discriminating from one another. $\Delta D$ may be calculated from ($D_{LGP} - D_{LED}$)/2. In each drawing, $\Delta D_{bottom}$ and $\Delta D_{top}$ are denoted by $\Delta D1$ and $\Delta D2$, respectively.

First, the gap G between the light emitting surfaces 25 of the LEDs 20 and the light entering end surface 41 of the light guide plate 40 will be described. In the backlight unit 12, which is the edge-light type backlight unit, the efficiency E of incident light from the LEDs 20 to the light guide plate 40 is about 100% in an ideal condition in which entire areas of the light emitting surfaces 25 of the LEDs 20 are closely attached to the light entering end surface 41 of the light guide plate 40. In a process of mounting the LEDs 20 on the LED board 30, for instance, in a reflow soldering process, a mounting error may occur in mounting of the LEDs 20 to the LED board 30. To compensate for the mounting error, the gap G is defined between the light emitting surface 25 of the LEDs 20 and the light entering end surface 41 of the light guide plate 40 in design of the backlight unit 12. In the backlight unit 12, the gap G between the light emitting surfaces 25 and the light entering end surface 41 is a sum of a dimension of a designed gap G' and the mounting error. The mounting error that may be produced between the LEDs 20 and the LED board 30 may be about ±0.05 to 0.1 mm in the Y-axis direction (the arrangement direction of the LEDs 20 and the light guide plate 40). If the LEDs 20 are displaced in a direction away from the light entering end surface 41 of the light guide plate 40, the dimension of the gap may become double the maximum mounting error, that is, 0.1 to 0.2 mm. The inventors of the present application have conducted an analysis of the efficiency E of incident light in cases of the gap G of 0.1 mm and of 0.2 mm through ray-trace simulation. In this embodiment, the gap G in the backlight unit 12 is about 0.1 mm, which is about equal to the designed gap G' and illustrated in the corresponding drawings.

Next, a relation between $\Delta D_{bottom}$ and $\Delta D_{top}$ will be described. In general, when the side emitting type LEDs 20 are used, the LED board 30 is attached to any one of the opposite plate surface 43 and the light exiting plate surface 42 of the light guide plate 40. In such a configuration, if regular LEDs and a regular LED board are used for the LEDs 20 and the LED board 30 and the LEDs 20 are mounted to the LED board 30 with a regular mounting member, it is difficult to increase $\Delta D_{bottom}$. $\Delta D_{top}$ can be increased by increasing the thickness of the light guide plate 40 even if regular LEDs and a regular LED board are used for the LEDs 20 and the LED board 30 and the LEDs 20 are mounted to the LED board 30 with a regular mounting member. Therefore, the inventors in the present application have focused on $D_{bottom}$ in the configuration in which a dimension $D_{LED}$ of the light emitting surface of each LED 20 in the Z-axis direction is smaller than a dimension $D_{LGP}$ of the light entering end surface of the light guide plate 40 and appropriately design mounting members for the LEDs 20 and/or the LED board 30 to improve the efficiency E of incident light.

FIG. 6 illustrates results of the analysis of the relation between $\Delta D$ and the efficiency E of incident light with the gap G set to 0.1 mm and to 0.2 mm through the ray-trace simulation. The relation between $\Delta D_{bottom}$ and efficiency of incident light and the relation between $\Delta D_{top}$ and efficiency of incident light are similar to each other. Therefore, the efficiency (E) of incident light from the LEDs 20 to the light guide plate 40 can be roughly estimated the square of the efficiency of incident light regarding $\Delta D$. Specifically, when the gap G is 0.2 mm, the dimension $D_{LGP}$ of the light entering end surface 41 in the Z-axis direction is 0.40 mm, the dimension $D_{LED}$ of the light emitting surface 25 in the Z-axis direction is 0.29 mm, $\Delta D_{bottom}$ is 0.055 mm, and $\Delta D_{top}$ is 0.055 mm, the efficiency of incident light regarding $\Delta D_{bottom}$ and the efficiency of incident light regarding $\Delta D_{top}$ are about 85%. Therefore, the efficiency E of incident light from the LEDs 20 to the light guide plate 40 can be estimated at about 72% through integration.

According to finding from the analysis by the inventors of the present application, as illustrated in FIG. 6, when the gap G is present, there is a positive correlation between ΔD and the efficiency of incident light such that an angle of a slope of the correlation decreases as ΔD increases. To improve the efficiency E of incident light, it is preferable that $ΔD_{bottom}=ΔD_{top}$. Specifically, if the center $C_{LED}$ is not aligned with the center $C_{LGP}$ of the light guide plate in the Z-axis direction and off the center $D_{LGP}$ by n (mm) to the LED board 30 side, $ΔD_{bottom}=(ΔD−n)$ and $ΔD_{top}=(ΔD+n)$. If the efficiency of incident light at ΔD is $E_{ΔD}$, the efficiency of incident light at $ΔD_{bottom}$ is expressed by $(E_{ΔD}−a)$ and the efficiency of incident light at $ΔD_{bottom}$ is expressed by $(E_{ΔD}+b)$. Because ΔD and $E_{ΔD}$ have positive correlation such that a slope of the correlation decreases as ΔD increases, a and b have a relation of a>b>0. When the efficiency of incident light $E_{ΔD}^2$ in a configuration in which $ΔD_{bottom}=ΔD_{top}=ΔD$ is compared with the efficiency of incident light $(E_{ΔD}−a)(E_{ΔD}+b)$ in a configuration in which $ΔD_{bottom}=(ΔD−n)$ and $ΔD_{top}=(ΔD+n)$, $E_{ΔD}^2−(E_{DL}−a)(E_{ΔD}+b)=(a−b)E_{ΔD}+ab>0$. The efficiency of incident light $E_{ΔD}^2$ in the configuration in which $ΔD_{bottom}=ΔD_{top}=ΔD$, that is, the center $C_{LED}$ of each light emitting surface 25 is opposed to the center $C_{LGP}$ of the light entering end surface 41 is higher than the efficiency of incident light $E_{ΔD}^2$ in the configuration in which $ΔD_{bottom}=(ΔD−n)$ and $ΔD_{top}=(ΔD+n)$, that is, the center $C_{LED}$ of each light emitting surface 25 is off the center $C_{LGP}$ of the light entering end surface 41.

Figure 7:
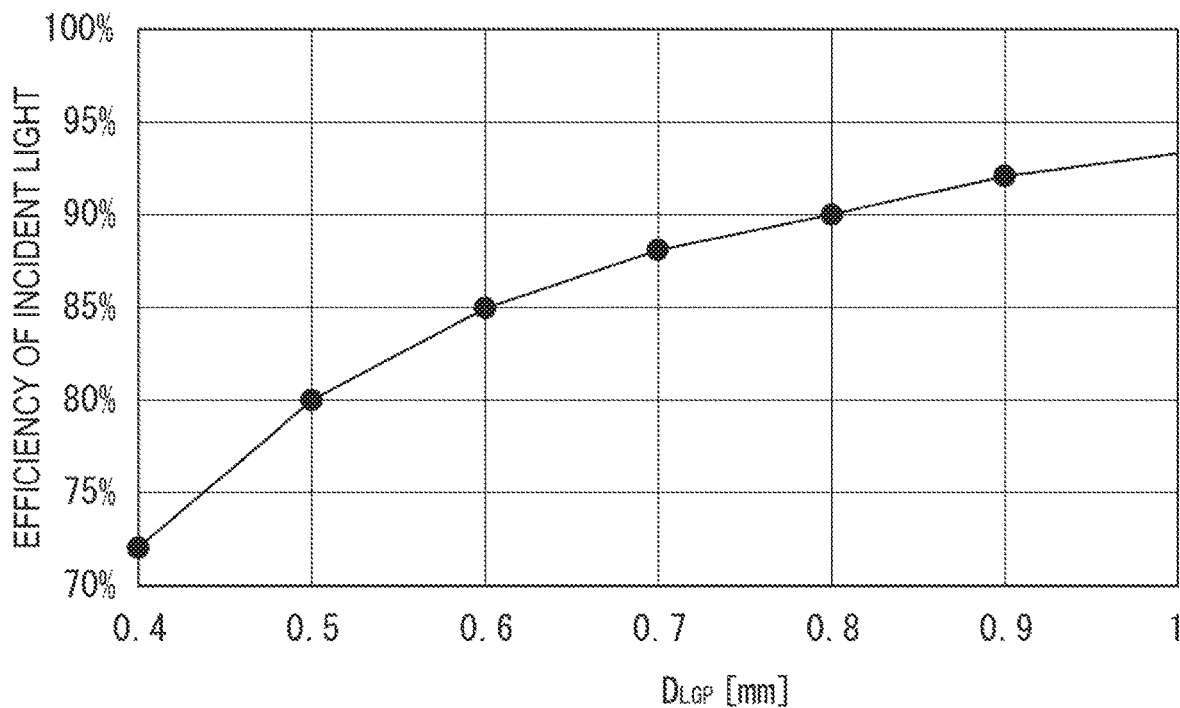
FIG. 7 is a graph illustrating a relation between $D_{LGP}$ and efficiency of incident light.
Figure 9:
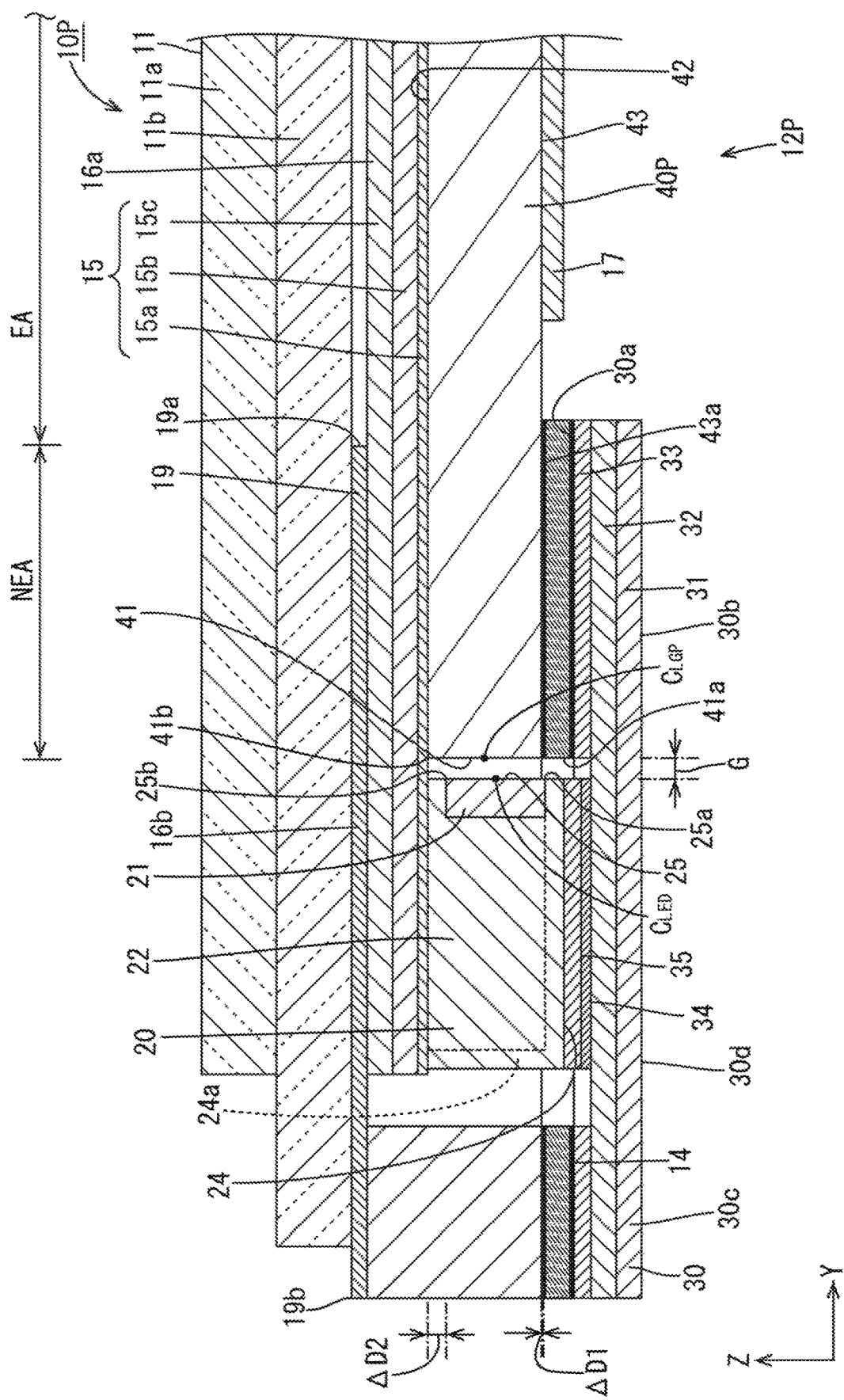
FIG. 9 is a magnified side cross-sectional view of a section including an LED and therearound in a liquid crystal display device according to a comparative example.

The inventors of the present application conducted extensive research on a relation between the dimension $D_{LGP}$ of the light entering end surface 41 and the efficiency E of incident light in the configuration in which $ΔD_{bottom}=ΔD_{top}$ and obtained results illustrated in FIG. 7. As illustrated in FIG. 7, in the configuration in which the gap G (0.2 mm) is present, the dimension $D_{LED}$ of each light emitting surface 25, and $ΔD_{bottom}=ΔD_{to}$, if the dimension $D_{LGP}$ of the light entering end surface 41 is 0.5 mm, that is, $D_{LGP}−D_{LED}$ is smaller than about 0.2 mm, the efficiency E of incident light regarding sharply decreases. To improve the efficiency E of incident light, it is preferable to set $D_{LGP}−D_{LED}$ to at least 0.2 mm or larger. If $D_{LGP}$ is 0.8 mm, that is, larger than 0.5 mm, the efficiency of incident light is 90% or higher, which is a sufficient level of the efficiency of incident light. In the embodiment described above, the dimension $D_{LGP}$ of the light entering end surface 41 is 0.4 mm. An area around the LEDs 20 in which the eyeball-type uneven brightness is more likely to occur due to the light rays that do not enter the light guide plate 40 among the light rays from the LEDs 20 (hereinafter referred to as stray light rays) is between 0.5 mm to 2 mm from the light entering end surface 41, which is reduced from 2.5 mm that is from the light entering end surface 41 to which the light rays from the LEDs 20 enter in a known configuration. It is confirmed that a reduction in width of the panel-side double-sided adhesive tape 19 that blocks the eyeball-type uneven brightness and a reduction of the non-effective light exiting area NEA of the backlight unit 12 contribute to the reduction in frame size of the liquid crystal display device 10. To improve the efficiency E of incident light and reduce the frame size of the liquid crystal display device 10, it is preferable to set $D_{LGP}−D_{LED}$ to about 0.5 mm or larger. Although the upper limit of $D_{LGP}−D_{LED}$ can be set as appropriate, it is preferable to set $D_{LGP}−D_{LED}$ to 2.0 mm or smaller to reduce the thickness of the backlight unit 12 because the efficiency of incident light significantly decreases when $D_{LGP}−D_{LED}2$ is 2.0 mm or larger.

In the configuration in which the gap G (0.2 mm) is present, relations illustrated in a table in FIG. 8 are observed among the dimension DLGP of the light entering end surface 41, a dimension L between the mounting surface 24 and the edge 25a of the light emitting surface 25 on the LED board 30 side in each LED 20, and the efficiency E of incident light. The dimension L is calculated from equation (1):

$$L=(D_{LGP}−D_{LED})/2−D1+D2 \qquad (1)$$

where $D_{LGP}$ is the dimension of the light entering end surface 41 in the thickness direction of the light guide plate 40, $D_{LED}$ is the dimension of the light emitting surface 25 in the thickness direction, the D1 is a distance in the thickness direction between the supporting layer 31 and the mounting surface 24 of each LED 20, and D2 is a distance in the thickness direction between the supporting layer 31 and the opposite plate surface 43 of the light guide plate 40 to which the LED board 30 is attached. In the LED board 30 in this embodiment, the thickness of the supporting layer 31 is 25 μm, the thickness of the trace is 35 μm, the thickness of the covering layer 33 is 25 μm, the thickness of each adhesive layer 36 is 20 μm, and the thickness of the board-side terminal 34 is about 3 μm. The adhesive layers 36 attach the supporting layer 31, the trace 32, and the covering layer 33 to one another. The thickness of the double-sided adhesive tape 14 that attaches the LED board 30 to the light guide plate 40 is 50 μm. The thickness of the soldering portions 35 that connect the board-side terminals 34 of the LED board 30 to the LED-side terminals 24a of the LEDs 20 is about 10 μm. The distance D1 between the supporting layer 31 in the LED mounting portion 30d and the mounting surface 24 of each LED 20 is about equal to a sum of the thicknesses of the supporting layer 31, the trace 32, the adhesive layer 36, the board-side terminal 34, and the soldering portion 35 (93 μm in this embodiment). The distance D2 between the supporting layer 31 in the light guide plate overlapping portion 30b and the opposite plate surface 43 of the light guide plate 40 is about equal to a sum of the thicknesses of the supporting layer 31, the trace 32, the covering layer 33, the adhesive layers 36, and the double-sided adhesive tape 14 (175 μm in this embodiment). Namely, in the configuration in which the LED board 30 and the double-sided adhesive tape 14 having general configurations used in this embodiment, $ΔD_{bottom}$ tends to be smaller because D1 and D1 are smaller. In such a configuration, if $D_{LGP}$ is 0.4 mm and $D_{LED}$ is 0.290 mm, L can be defined as 137 μm from equation (1). In this case, the efficiency of incident light is about 72%, which is 1.04 times higher in comparison to a comparative example, which will be described later.

In this embodiment, each LED 20 has a configuration as illustrated in FIG. 5. An outer dimension of the LED 20 (or the housing 22) in the Z-axis direction is about 0.482 mm. The dimension of the light emitting surface in the Z-axis direction is about 0.290 mm. In each LED 20, a dimension between the mounting surface 24 and the edge 25a of the light emitting surface 25 on the rear side (the light source board side), that is, the dimension L (a thickness) of the housing 22 on the rear side relative to the light emitting surface 25 is 0.137 mm. A dimension between an opposite surface from the mounting surface 24 and the edge 25b of the light emitting surface 25 on the front side (the opposite side from the light source board), that is, the thickness of the housing 22 on the front side relative to the light emitting surface 25 is about 0.055 mm. In this embodiment, each LED 20 is configured such that the dimension L between the mounting surface 24 and the edge 25a of the light emitting surface 25 on the rear side is larger than the dimension between the opposite surface from the mounting surface 24 and the edge 25b of the light emitting surface 25 on the front side. The LED 20 is disposed such that the light emitting surface 25 is not centered relative to the outline of the LED 20 and is off toward the front side in the Z-axis direction but centered relative to the outline in the X-axis direction. A surface of the housing 22 opposed to the light entering end surface 41 functions as a light reflecting surface for reflecting light toward the light entering end surface 41. By increasing the dimension L of the housing 22, the light reflectivity of the housing 22 can be increased in comparison to a conventional LED. Therefore, the efficiency E of incident light improves. If $D_{LGP}$ is 0.6 mm and $D_{LED}$, D1, and D2 are defined similar to those described above, L is defined as 237 μm from equation (1). If L is 237 μm, the dimension L of the housing 22 of an LED may be altered but other dimensions are defined similar to those of the LED 20 described above. In this case, the efficiency of incident light is about 85%, which is 1.22 times higher in comparison to the comparative example (see FIG. 8).

As described above, the backlight unit 12 in this embodiment includes the LEDs 20, the light guide plate 40, and the LED board 30. The LEDs 20 are the side emitting type LEDs. Each LED 20 includes the mounting surface 24 including the LED-side terminals 24a and the light emitting surface 25 on the side of the mounting surface 24. The light guide plate 40 is the plate member. The light guide plate 40 includes the light entering end surface 41, the light exiting plate surface 42, and the opposite plate surface 43. The light entering end surface 41 is the end surface of the plate member and opposed to the light emitting surfaces 25. The light rays from the LEDs 20 enter the light entering end surface 41. The light exiting plate surface 42 is one of the plate surfaces of the plate member. The light rays that have entered through the light entering end surface 41 exit through the light exiting plate surface 42. The opposite plate surface 43 is the other one of the plate surfaces of the plate member. The LEDs 20 are mounted on the LED board 30. The board-side terminals 34 connected to the LED-side terminals are formed on the plate surface 30a of the LED board 30. The plate surface 30a is attached to the edge of the opposite plate surface 43 or the light exiting plate surface 42 of the light guide plate 40 on the light entering end surface 41 side. The gap G is present between the light emitting surfaces 25 of the LEDs 20 and the light entering end surface 41 of the light guide plate 40. The light emitting surface 25 of each LED 20 has a dimension in the thickness direction of the light guide plate 40 smaller than the dimension of the light entering end surface 41 in the same direction. Each LED 20 is disposed such that the center $C_{LED}$ of the light emitting surface 25 is opposed to the center $C_{LGP}$ of the light entering end surface 41.

If the light emitting surfaces 25 of the LEDs 20 are closely attached to the light entering end surface 41 of the light guide plate 40, that is, in an ideal condition, the efficiency of incident light is about 100%. When the LEDs 20 that are the side emitting type LEDs are used, the mounting errors may be produced in the mounting of the LEDs 20 to the LED board 30. Therefore, a gap may be created between the light emitting surfaces 25 and the light entering end surface 41. In such a configuration in which such a gap is created, the efficiency of incident light may become an issue. Through extensive study, the inventors have found that there is a correlation between the efficiency of incident light from the light emitting surface 25 to the light guide plate 40 and a positional relation between the light emitting surface 25 and the light entering end surface 41 as illustrated in FIG. 6 when the gap G is created between the light emitting surfaces 25 of the LEDs 20 and the light entering end surface 41 of the light guide plate 40. By disposing the LEDs 20 such that the center $C_{LED}$ of each light emitting surface 25 is opposed to the center $C_{LGP}$ of the light entering end surface 41, the efficiency E of incident light from the LEDs 20 to the light guide plate 40 can be sufficiently improved in comparison to the configuration in which the center $C_{LED}$ of each light emitting surface 25 is off the center $C_{LGP}$ of the light entering end surface 41.

In this embodiment, the light guide plate 40 is configured such that the dimension of the light entering end surface 41 in the thickness direction of the light guide plate 40 is larger than the dimension of the light emitting surface by 0.2 mm or greater. According to the configuration, as illustrated in the graph in FIG. 6, the efficiency E of incident light from the light emitting surface to the light guide plate can be further properly improved.

In this embodiment, the light guide plate 40 is configured such that the dimension of the light entering end surface 41 in the thickness direction of the light guide plate 40 is larger than the dimension of the light emitting surface by 0.5 mm or greater. According to the configuration, as illustrated in the graph in FIG. 6, the efficiency E of incident light from the light emitting surface 25 to the light guide plate 40 can be further properly improved.

This embodiment further includes the light blocking member 19 for blocking the light rays from the LEDs 20 on the light exiting plate surface 42 side of the light guide plate 40. The light blocking member 19 is disposed such that the outer edge 19a of the light guide plate 40 is at the position between 0.5 mm and 2.0 mm from the light emitting surfaces 25 in the direction in which the LEDs 20 and the light guide plate 40 are arranged. By setting the positional relation between the light emitting surfaces 25 and the light entering end surface 41 as described above, the efficiency of incident light from the light emitting surfaces 25 to the light guide plate can be achieved at a high level. The uneven brightness (so-called eyeball-type uneven brightness) resulting from the light rays that have not entered the light guide plate is reduced. This configuration can contribute to the reduction in frame size of the display device that includes the lighting device in which the width of the light blocking member is defined as described above.

In this embodiment, the plate surface 30a of the LED board 30 is attached to the edge 43a of the opposite plate surface 43 of the light guide plate 40 on the light entering end surface 41 side. According to the configuration, the light rays from the light exiting plate surface 42 are less likely to be blocked by the LED board 30 that is disposed on the light exiting plate surface 42 side. This configuration can further properly contribute to the reduction in frame size of the liquid crystal display device 10 that includes the backlight unit 12.

In this embodiment, each LED 20 is configured such that the dimension L between the mounting surface 24 and the edge 25a of the light emitting surface 25 on the LED board 30 side is larger than the dimension between the opposite surface from the mounting surface 24 and the edge 25b of the light emitting surface 25 on the opposite side from the LED board 30. According to the configuration, ΔD illustrated in the graph in FIG. 6 can be properly increased and the efficiency of incident light from the light emitting surface 25 to the light guide plate 40 can be further properly improved.

In this embodiment, the LED board 30 includes at least the trace 32 and the supporting layer 31. The trace 32 is formed in a pattern from the conductive layer and connected to the LED-side terminals 24a via the board-side terminals 34. The supporting layer 31 supports the trace 32 from the opposite side from the LEDs 20. The dimension L of the section of the housing 22 located on the LED board 30 side relative to the light emitting surface 25 in the thickness direction of the light guide plate 40 is defined to satisfy the following equation:

$$L=(D_{LGP}-D_{LED})/2-D1+D2$$

where $D_{LGP}$ is the dimension of the light entering end surface 41, $D_{LED}$ is the dimension of the light emitting surface 25, D1 is the distance between the supporting layer 31 and the mounting surface 24 of each LED 20, and D2 is the distance between the supporting layer 31 and the opposite plate surface 43 of the light guide plate 40 to which the LED board 30 is attached. According to the configuration, the backlight unit 12 having high efficiency of incident light can properly designed.

The liquid crystal display device 10 according to this embodiment includes the backlight unit 12 and the liquid crystal panel 11 that is configured to display images using the light from the backlight unit 12. Because the efficiency of incident light in the backlight unit 12 is improved, the liquid crystal display device 10 can be provided with high brightness and low power consumption.

Comparative Example

A liquid crystal display device 10P that includes a backlight unit 12P according to a comparative example of the present invention will be described with reference to FIG. 6. In the backlight unit 12P according to the comparative example, components corresponding to those of the first embodiment will be indicated by the same symbols with letter P added thereto.

In the backlight unit 12P, the dimension L of the housing 22P of each LED 20P is smaller than that of LED 20 in the first embodiment. The dimension L is about 55 µm. Except for the dimension L, the LED 20 is configured similar to the first embodiment. The dimension L of the housing 22 on the rear side relative to the light emitting surface 25 (the opposite side from the light source board) is about equal to the thickness of the housing 22 on the rear side relative to the light emitting surface 25 (the light source board side). Each LED 20P includes the light emitting surface that is located in the middle relative to the outline, that is, the LED 20P is a general-purpose type LED. The thickness of a light guide plate 40P, that is, the dimension $D_{LGP}$ of a light entering end surface 41P is smaller than that of the light guide plate 40 in the first embodiment. The thickness is about 0.315 mm. Except for the above, the backlight unit 12P is configured to the backlight unit 12 in the first embodiment. In the backlight unit 12P, when the gap G is 0.2 mm, $\Delta D_{top}$ is 0.06 mm and $\Delta D_{bottom}$ is 0.015 mm. The efficiency of incident light at $\Delta D_{top}$ is about 86% and the efficiency of incident light at $\Delta D_{bottom}$ is about 81%. The efficiency E of incident light from the LEDs 20 to the light guide plate 40 is about 70%, which is calculated through integration. Namely, the efficiency of incident light in the backlight unit 12 in the first embodiment is improved in comparison to the backlight unit P in the comparative example.

Second Embodiment

Figure 10:
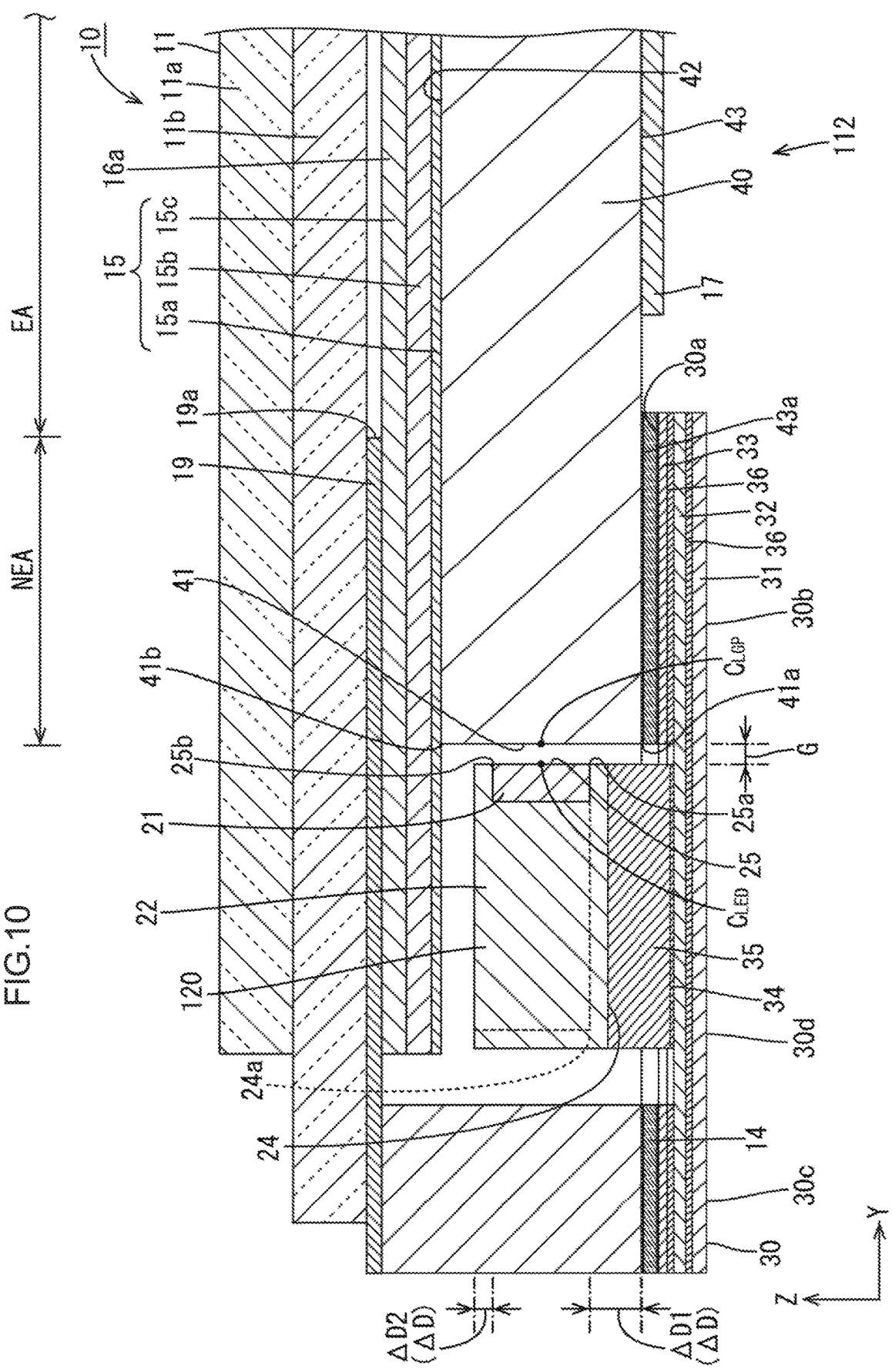
FIG. 10 is a plan view of a section of a liquid crystal display device including an LED and therearound according to a second embodiment of the present invention.

A second embodiment of the present invention will be described with reference to FIGS. 10 and 11. The second embodiment includes a backlight unit 112 that includes LEDs and soldering portion having configurations different from those of the first embodiment. Configurations, functions, and effects similar to those of the first embodiment will not be described.

LEDs 120 are general-purpose type LEDs similar to the LEDs 120P in the comparative example described above. Soldering portions 135 have thicknesses larger than the thicknesses of those in the first embodiment and the comparative example in the range from 10 to 15 µm, which are normal thicknesses.

Each soldering portion 135 has a dimension S in the thickness direction of the light guide plate 40 is equal to or larger than 92 µm and equal to or smaller than 200 µm. If the dimension S of the soldering portion is 92 µm, as illustrated in FIG. 11, the efficiency of incident light is 1.04 times higher than that of the comparative example, that is, improved. Through the experiment, in a configuration in which each soldering portion 135 is larger than 200 µm, it is found that a defect such as displacement of the LEDs 120 during a reflow soldering process, which will be described later, and tombstoning occurs. In a configuration in which the dimension S of each soldering portion 135 is 192 µm, the efficiency of incident light is at least 1.22 times higher in comparison to the comparative example, that is, the efficiency is improved.

In the configuration in which the gap G (0.2 mm) is present, the dimension S of the soldering portion 135 and the efficiency E of incident light have a relation illustrated in FIG. 11. Specifically, the dimension S can be calculated from equation (2):

$$S=(DLGP-DLED)/2-D3+D2-L \qquad (2)$$

where D3 is a dimension between the supporting layer 31 and the mounting surface 24 of each LED 120 excluding the soldering portion 135 in the thickness direction of the light guide plate.

The soldering portions 135 are formed through the reflow soldering process in general. The reflow soldering process includes an applying process, a mounting process, a preheating process, a heating process, and a cooling process. In the applying process, a soldering paste is applied to the board-side terminals 34 of the LED board 30. In the mounting process, the LEDs 120 are mounted to sections to which the soldering paste is applied using a chip mounter. In the preheating process, the board and components are preheated (in general, about 150° C. to 170° C.). In the heating process, heating is performed until a temperature reaches a melting temperature of the soldering paste (in general, from 220° C. to 260° C.). Each soldering portion 135 can be provided with a predefined thickness by properly setting a thickness of a forming sheet (a metal mask) in the applying process. The method of forming the soldering portion 135 is not limited to the reflow soldering. For example, the soldering portions 135 may be formed using an anisotropic conductive film (ACF) or an anisotropic conductive paste. The anisotropic conductive film is mounted through pressure bonding. Therefore, the defect such as the tombstoning is less likely to occur and thus this method may be preferable. When using the anisotropic conductive film, it is preferable to set a curing temperature to cure the anisotropic conductive film low (e.g., equal to or below 120° C.) so that the LEDs 120 are not damaged during mounting.

According to this embodiment, ΔD illustrated in the graph in FIG. 6 can be properly increased and thus the efficiency E of incident light from the light emitting surfaces 25 to the light guide plate 40 can be further properly improved. By defining the dimension S of each soldering portion 135 to satisfy equation (2), the backlight unit 12 with high efficiency E of incident light can be properly designed.

Third Embodiment

Figure 12:
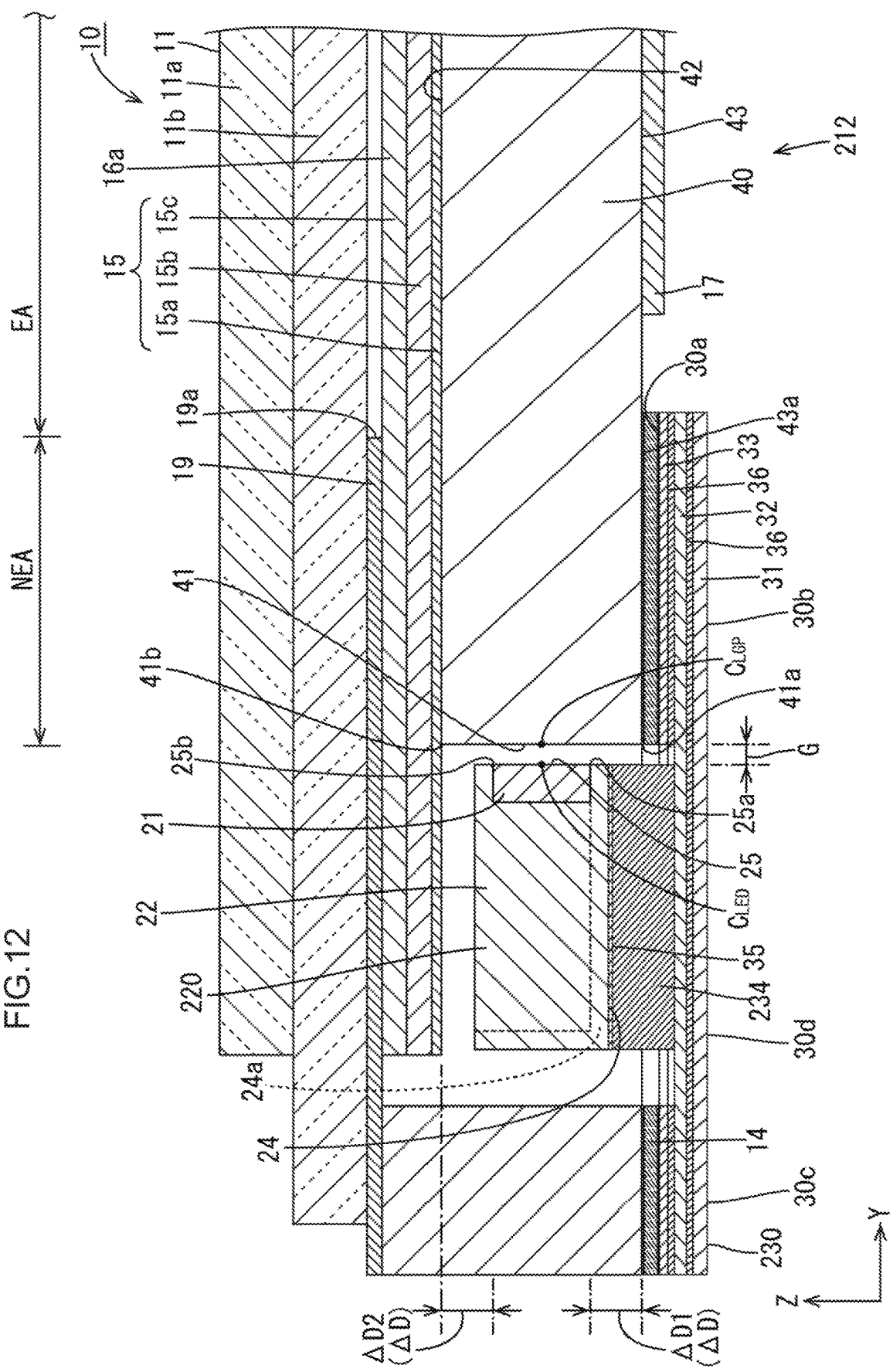
FIG. 12 is a plan view of a section of a liquid crystal display device including an LED and therearound according to a third embodiment of the present invention.

A third embodiment of the present invention will be described with reference to FIGS. 12 and 13. The third embodiment includes a backlight unit 212 that includes LEDs and board-side terminals having configurations different from those of the first embodiment. Configurations, functions, and effects similar to those of the first embodiment will not be described.

LEDs 220 are general-purpose type LEDs similar to the LEDs 220P in the comparative example. Board-side terminals 234 of an LED board 230 have a thickness larger than those of the first embodiment and the comparative example, which are normal thicknesses in the range from 3 to 10 μm.

Each board-side terminal 234 has a dimension T in the thickness direction of the light guide plate 40 is equal to or larger than 85 μm. It is preferable to set the dimension T of the board-side terminal 234 equal to or smaller than 200 μm from the perspective of flatness of the terminals to mount the LEDs with less failure. In a configuration in which the dimension T of each board-side terminal 234 is set to 85 μm, the efficiency of incident light is at least 1.04 times higher in comparison to the comparative example as illustrated in FIG. 13. In a configuration in which the dimension T of each board-side terminal 234 is set to 185 μm, the efficiency of incident light is at least 1.22 times higher in comparison to the comparative example as illustrated in FIG. 13.

In the configuration in which the gap G (0.2 mm) is present, the dimension T of the board-side terminal 234 and the efficiency of incident light have a relation illustrated in FIG. 13. Specifically, the dimension T can be calculated from the equation (3):

$$T=(D_{LGP}-D_{LED})/2-D4+D2-L \qquad (3)$$

where D4 is a dimension between the supporting layer 31 and the mounting surface 24 of the LED 220 excluding the board-side terminal 234 in the thickness direction of the light guide plate 40.

Each board-side terminal 234 is formed from a metal layer such as nickel and gold formed through electroplating. In this embodiment, the board-side terminal 234 is made of nickel and formed through the electroplating. According to the method, the film can be formed at low cost and with high strength. When the electroplating is used, an adjustment of a thickness of the film is easy. However, to increase the flatness of the board-side terminal 234 that has the film thickness equal to or larger than 50 μm, surface polishing may be performed after the plating.

In this embodiment, sufficiently large ΔD in the graph in FIG. 6 can be achieved. Therefore, the efficiency E of incident light from the light emitting surfaces 25 to the light guide plate 40 can be further properly improved. By configuring the board-side terminals 234 such that the dimension T is defined to satisfy equation (3), the backlight unit 12 with high efficiency E of incident light can be properly designed.

Fourth Embodiment

Figure 14:
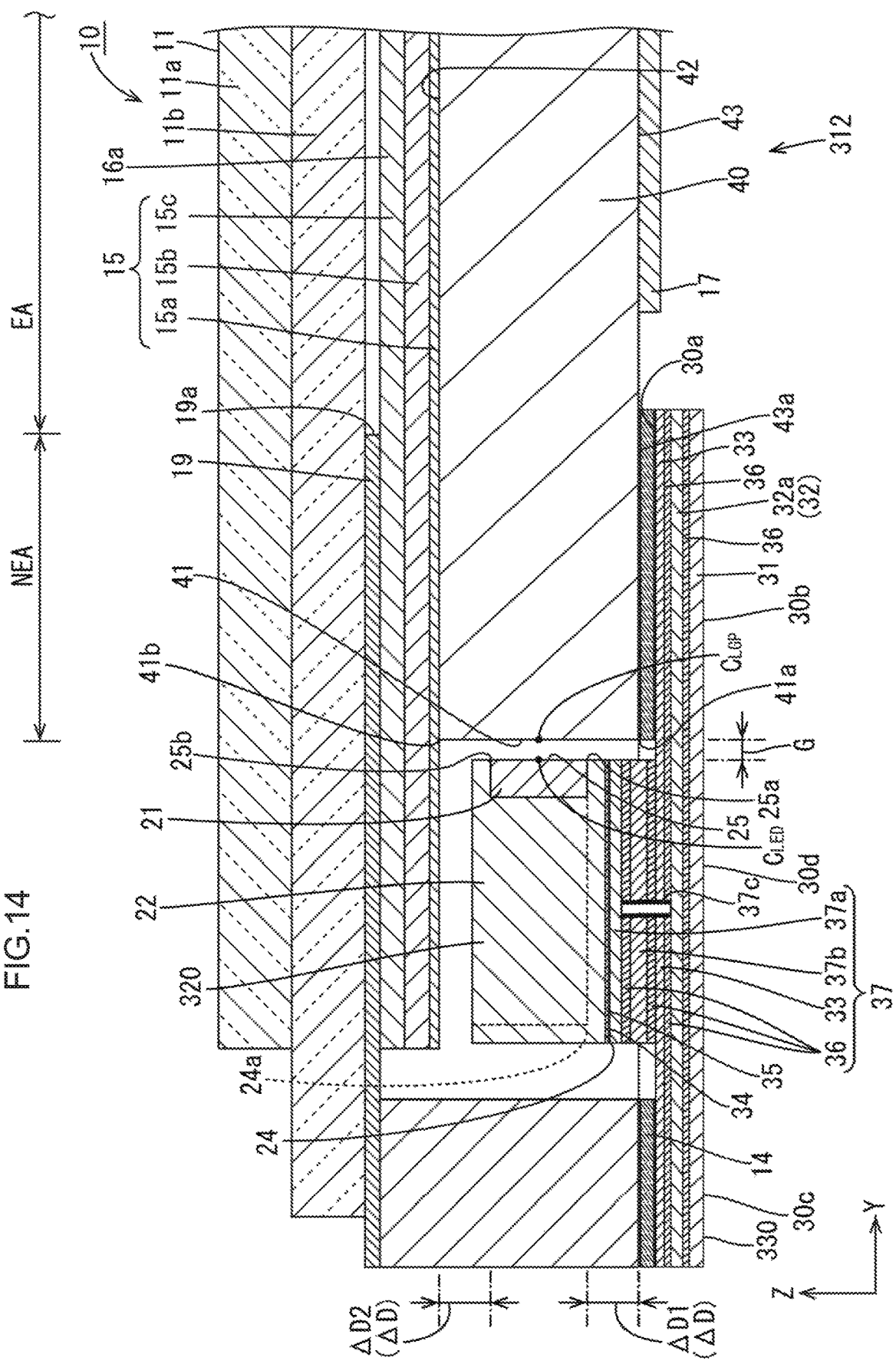
FIG. 14 is a plan view of a section of a liquid crystal display device including an LED and therearound according to a fourth embodiment of the present invention.

A fourth embodiment of the present invention will be described with reference to FIGS. 14 and 15. The fourth embodiment includes a backlight unit 312 that includes an LED board having a configuration different from that of the first embodiment. Configurations, functions, and effects similar to those of the first embodiment will not be described.

LEDs 320 are general-purpose type LEDs similar to the LEDs 320P in the comparative example. An LED board 330 includes a section having a multi-layer flexible board configuration unlike the LED board 30 in the first embodiment, which has a single-layer flexible board configuration.

The LED board 330 includes the LED mounting section 30d and the light guide plate overlapping section 30b. The LED mounting section 30d includes the trace 32, the supporting layer 31, and an elevating layer 37. The trace 32 includes a first conductive layer 32a that is formed in a pattern and connected to the LED-side terminals 24a via the board-side terminals 34. The supporting layer 31 supports the trace 32 from an opposite side from the LED 320 side. The elevating layer 37 includes multiple layers including a second conductive layer 37a that connects the trace 32 to the board-side terminals 34. The elevating layer 37 elevates the board-side terminals 34 from the supporting layer 31. The light guide plate overlapping section 30b does not include the elevating layer 37 but includes the trace 32 and the supporting layer. The first conductive layer 32a and the second conductive layer 37a are connected to each other via a through hole 37c.

In the configuration in which the gap G (0.2 mm) is present, the dimension F of the elevating layer 37 and the efficiency E of incident light have a relation illustrated in FIG. 15. Specifically, the dimension F can be calculated from the equation (4):

$$F=(D_{LGP}-D_{LED})/2-D5+D2-L \qquad (4)$$

where D5 is a dimension between the supporting layer 31 and the mounting surface 24 of the LED 320 excluding the board-side terminal 234 in the thickness direction of the light guide plate 40.

The elevating layer 37 can be formed using a general technology for forming a multi-layer flexible circuit board. Specifically, the elevating layer 37 is formed by layering a second covering layer 37b over the first covering layer 33 via the adhesive layer 36 and the second conductive layer 37a via the adhesive layer 36. The thicknesses of the second covering layer 37b, the second conductive layer 37a, and adhesive layers 36 may be set to about 50 μm, 35 μm, and 26 μm, respectively. Therefore, the dimension F of the elevating layer 37 is 137 μm. In the configuration in which the dimension F of the elevating layer 37 is 137 μm, as illustrated in FIG. 15, the efficiency of incident light is at least 1.22 times higher in comparison to the comparative example. The dimension F of the elevating layer 37 can be adjusted by appropriately designing thicknesses of additional layers or the number of the additional layers.

In this embodiment, sufficiently large ΔD in the graph in FIG. 15 can be achieved. Therefore, the efficiency E of incident light from the light emitting surfaces 25 to the light guide plate 40 can be further properly improved. By configuring the elevating layer 37 such that the dimension F is defined to satisfy equation (4), the backlight unit 12 with high efficiency E of incident light can be properly designed.

Other Embodiments

The present invention is not limited to the embodiments, which have been described using the foregoing descriptions and the drawings. The following embodiments may be included in the technical scope of the present invention.

(1) The dimensions $D_{LGP}$, $D_{LED}$, L, S, T, and F can be altered from those of that above embodiments where appropriate.

(2) The configurations of the embodiments may be combined where appropriate to properly adjust the center $C_{LED}$ of each light emitting surface 25 relative to the center $D_{LGP}$ of the light entering end surface 41. For example, the second embodiment and the third embodiment may be combined where appropriate to configure the soldering portions and the board-side terminals to have larger dimensions in comparison to the general-purpose type LED board and the mounting means.

(3) In each of the above embodiments, the LED board is attached to the opposite plate surface of the light guide plate. However, the LED board may be attached to the light exiting plate surface of the light guide plate as illustrated in FIG. 16.

(4) In each of the above embodiments, the dimension L is equal to the thickness of the housing. However, the dimension L is not limited to that. For example, the dimension L may be adjusted by altering the thickness of the LED-side terminals where appropriate.

(5) In each of the above embodiments, the optical sheet includes the low light transmissive section. However, the optical sheet may not include the low light transmissive section. The area of the low light transmissive section can be defined where appropriate. For example, the low light transmissive section may be formed in areas around the LEDs.

(6) In each of the above embodiments, the covering layer of the LED board includes the light absorbing sections. However, the covering layer may not include the light absorbing section. The forming areas of the light absorbing sections can be altered where appropriate. For example, the light absorbing sections may be formed in the light guide plate overlapping section or in the entire area of the LED board.

(7) In the first embodiment, the double-sided adhesive tape is in black. In the second embodiment, the double-sided adhesive tape is in white. However, the color of the adhesive tapes can be altered where appropriate.

(8) In each of the above embodiments, the liquid crystal panel, the optical sheet, and the light guide plate have the quadrilateral shapes in the plan view. However, the liquid crystal panel, the optical sheet, and the light guide plate may have non-quadrilateral shapes such as round shapes and oval shapes.

(9) The number of the LEDs mounted on the LED board may be altered from that of each embodiment where appropriate.

(10) In each of the above embodiments, the LED board includes the film-shaped base having the flexibility. However, the LED board may include a plate-shaped base having a certain thickness and hardness.

(11) In each of the above embodiments, the LED board includes the LEDs mounted on the substrate. However, the present invention can be applied to light source boards that include other types of light sources mounted on light source substrates.

(12) In each of the above embodiment sections, the liquid crystal display device including the backlight unit and liquid crystal panel, which is the display panel, is described. However, the present invention can be applied to micro electro mechanical systems (MEMS) display devices that include backlight units and MEMS display panels, which are display panels.

EXPLANATION OF SYMBOLS

10: Liquid crystal display device
11: Liquid crystal panel (Display panel)
12, 112, 212, 312: Backlight unit (Lighting device)
19: Panel-side double-sided adhesive tape (Light blocking member)
19a: Edge
20, 120, 220, 320: LED (Light source)
24: Mounting surface
24a: LED-side terminal (Light source-side terminal)
25: Light emitting surface
25a: Edge
25b: Edge
30, 230, 330: LED board (Light source board)
30a: Plate surface
30b: Light guide plate overlapping section
30d: LED mounting section (Light source mounting section)
31: Supporting layer
32: Trace
32a: First conductive layer
34: Board-side terminal
35: Soldering portion
37: Elevating layer
37a: Second conductive layer
37c: Through hole
40: Light guide plate
41: Light entering end surface
42: Light exiting plate surface
43: Opposite plate surface
43a: Edge
45: Recess
47: Protruding portion
G: Gap
$C_{LGP}$: Center of light entering end surface
$C_{LED}$: Center of light emitting surface

The invention claimed is:

1. A lighting device comprising:
at least one light source being a side emitting-type light source, the at least one light source including a mounting surface and a light emitting surface, the mounting surface including a light source-side terminal, the light emitting surface being located on a side of the mounting surface;
a light guide plate that is a plate-shaped member including:
  a light entering end surface being an end surface of the plate-shaped member, the light entering end surface being opposed to the light emitting surface and through which light rays from the at least one light source enter;
  a light exiting plate surface being a first plate surface of the plate-shaped member and through which the light rays having entered through the light entering end surface exit; and
  an opposite plate surface being a second plate surface of the plate-shaped member; and
a light source board on which the at least one light source is mounted, the light source board including:
  a plate surface attached to an edge of the opposite plate surface of the light guide plate on a light entering surface side or an edge of the light exiting plate surface on a light entering surface side; and
  a board-side terminal formed on the plate surface and connected to the light source-side terminal, wherein
the light emitting surface of the at least one light source and the light entering end surface of the light guide plate are opposed to each other with a gap,
the at least one light source includes a light emitting surface having a dimension in a thickness direction of the light guide plate smaller than a dimension of the light entering end surface in the thickness direction, and the at least one light source is disposed such that a center of the light emitting surface is opposed to a center of the light entering end surface, the light source board includes a light guide plate overlapping section and a light source mounting section overlapping the light guide plate and the light source in the thickness direction of the light guide plate, respectively, the light source mounting section includes:
　a trace formed in a pattern from a first conductive layer and connected to the light source-side terminal via the board-side terminal;
　a supporting layer supporting the trace from an opposite side from the light source; and
　an elevating layer including a plurality of layers including a second conductive layer that connects the trace to the board-side terminal, the elevating layer elevating the board-side terminal from the supporting layer, and the light guide plate overlapping section includes the trace and the supporting layer but not include the elevating layer.

2. The lighting device according to claim 1, wherein the dimension of the light entering end surface of the light guide plate in the thickness direction of the light guide plate is larger than the dimension of the light emitting surface by 0.2 mm or greater.

3. The lighting device according to claim 1, wherein the dimension of the light entering end surface of the light guide plate in the thickness direction of the light guide plate is larger than the dimension of the light emitting surface by 0.5 mm or greater.

4. The lighting device according to claim 1, further comprising a light blocking member configured to block some of the light rays from the at least one light source, wherein the light blocking member is disposed such that an edge on a light guide plate side is at a position in a range from 0.5 mm to 2.0 mm from the light emitting surface with respect to an arrangement direction in which the at least one light source and the light guide plate are arranged.

5. The lighting device according to claim 4, wherein the plate surface of the light source board is attached to the edge of the opposite plate surface of the light guide plate on the light entering end surface side.

6. The lighting device according to claim 1, wherein the at least one light source is configured such that a dimension between the mounting surface and an edge of the light emitting surface on a light source board side is larger than a dimension between a surface on an opposite side from the mounting surface and an edge of the light emitting surface on an opposite side from the light source board.

7. The lighting device according to claim 6, wherein the light source board includes at least:
　a trace formed in a pattern from a conductive layer and connected to the light source-side terminal via the board-side terminal; and
　a supporting layer supporting the trace from an opposite side from the light source, the light source has a dimension L between the mounting surface and an edge of the light emitting surface on a light source board side, the dimension L is defined to satisfy the following equation:

$$L=(D_{LGP}-D_{LED})/2-D1+D2$$

where $D_{LGP}$ is a dimension of the light entering end surface, $D_{LED}$ is a dimension of the light emitting surface, D1 is a dimension between the supporting layer and the mounting surface of the light source, and D2 is a dimension between the supporting layer and a plate surface of the light guide plate to which the light source board is attached.

8. The lighting device according to claim 1, wherein the light source board includes at least:
　a trace formed in a pattern from a conductive layer and connected to the light source-side terminal via the board-side terminal;
　a supporting layer supporting the trace from an opposite side from the light source; and
　a soldering portion disposed between the trace and the at least one light source to connect the board-side terminal to the light source-side terminal, and the soldering portion has a dimension in a thickness direction of the light guide plate defined in a range from 92 μm to 200 μm.

9. The lighting device according to claim 8, wherein the soldering portion has a dimension S in the thickness direction of the light guide plate, and the dimension S is defined to satisfy the following equation:

$$S=(D_{LGP}-D_{LED})/2-D3+D2-L$$

where L is a dimension between the mounting surface and an edge of the light emitting surface on a light source board side, $D_{LGP}$ is a dimension of the light entering end surface, $D_{LED}$ is a dimension of the light emitting surface, D3 is a dimension between the supporting layer of the light source board and the mounting surface of the light source excluding the soldering portion, and D2 is a dimension between the supporting layer and a plate surface of the light guide plate to which the light source board is attached.

10. The lighting device according to claim 1, wherein the light source board includes at least:
　a trace formed in a pattern from a conductive layer and connected to the light source-side terminal via the board-side terminal; and
　a supporting layer supporting the trace from an opposite side from the light source, and the board-side terminal has a dimension in the thickness direction of the light guide plate equal to or larger than 85 μm.

11. The lighting device according to claim 10, wherein the board-side terminal has a dimension T in the thickness direction of the light guide plate, and the dimension T is defined to satisfy the following equation:

$$T=(D_{LGP}-D_{LED})/2-D4+D2-L$$

where L is a dimension between the mounting surface and an edge of the light emitting surface on a light source board side, $D_{LGP}$ is a dimension of the light entering end surface, $D_{LED}$ is a dimension of the light emitting surface, D4 is a dimension between the supporting layer and the mounting surface of the light source excluding the board-side terminal, and D2 is a dimension between the supporting layer and a plate surface of the light guide plate to which the light source board is attached.

12. The lighting device according to claim 1, wherein the first conductive layer and the second conductive layer are connected to each other via a through hole.

13. The lighting device according to claim 1, wherein
the elevating layer has a dimension F in the thickness direction of the light guide plate, and
the dimension F is defined to satisfy the following equation:

$$F=(D_{LGP}-D_{LED})/2-D5+D2-L$$

where L is a dimension between the mounting surface and an edge of the light emitting surface on a light source board side, $D_{LGP}$ is a dimension of the light entering end surface, $D_{LED}$ is a dimension of the light emitting surface, D5 is a dimension between the supporting layer of the light source board and the mounting surface of the light source excluding the elevating layer, and D2 is a dimension between the supporting layer and a plate surface of the light guide plate to which the light source board is attached.

14. A display device comprising:
the lighting device according to claim 1; and
a display panel configured to display an image using the light rays from the lighting device.

* * * * *